US012699721B2

(12) United States Patent
Wu et al.

(10) Patent No.: US 12,699,721 B2
(45) Date of Patent: Aug. 4, 2026

(54) METHOD AND SYSTEM FOR EXTRACTING INFORMATION FROM DOCUMENTS WITH VARYING FORMATS

(71) Applicant: Schlumberger Technology Corporation, Sugar Land, TX (US)

(72) Inventors: Jing Wu, Houston, TX (US); Babu Sai Sampath Reddy Vinta, Houston, TX (US); Arvind Sharma, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 163 days.

(21) Appl. No.: 18/822,896

(22) Filed: Sep. 3, 2024

(65) Prior Publication Data
US 2026/0064741 A1 Mar. 5, 2026

(51) Int. Cl.
*G06F 16/334* (2025.01)
*G06F 40/106* (2020.01)

(52) U.S. Cl.
CPC ........ *G06F 16/3344* (2019.01); *G06F 40/106* (2020.01)

(58) Field of Classification Search
USPC .................................................... 704/1–504
See application file for complete search history.

(56) References Cited

U.S. PATENT DOCUMENTS

| | | | | |
|---|---|---|---|---|
| 7,142,728 B2 * | 11/2006 | Wnek | .................. | G06V 30/416 |
| | | | | 382/173 |
| 11,586,613 B2 * | 2/2023 | Korpman | ............ | G06F 16/9577 |

| | | | | |
|---|---|---|---|---|
| 11,829,399 B1 * | 11/2023 | Pillai | ..................... | G06F 40/279 |
| 12,039,263 B1 * | 7/2024 | Mondlock | ............... | G06F 40/20 |
| 12,147,464 B2 * | 11/2024 | Pillai | ..................... | G06F 40/279 |
| 2003/0215137 A1 * | 11/2003 | Wnek | .................. | G06V 30/416 |
| | | | | 382/181 |
| 2010/0070448 A1 * | 3/2010 | Omoigui | ............. | H10F 39/1825 |
| | | | | 706/55 |
| 2012/0191716 A1 * | 7/2012 | Omoigui | ............. | H10F 39/1825 |
| | | | | 707/E17.069 |
| 2019/0005012 A1 * | 1/2019 | Priestas | .................. | G06N 20/00 |
| 2023/0367969 A1 * | 11/2023 | Chaturvedi | ......... | G06F 16/3329 |
| 2024/0086440 A1 * | 3/2024 | Pillai | ...................... | G06F 16/93 |

(Continued)

FOREIGN PATENT DOCUMENTS

| | | | | |
|---|---|---|---|---|
| CN | 118484519 A | * | 8/2024 | ............. G06F 40/30 |

*Primary Examiner* — Marcus T Riley
(74) *Attorney, Agent, or Firm* — Kyle R. Miiller

(57) ABSTRACT

Certain aspects of the disclosure provide a method for extracting attributes from documents with varying formats, layouts and complexities. The method displays a user interface (UI) that enables a user to obtain an unstructured document from a knowledge base. The method converts the unstructured document into a text document using a text recognition. The method obtains, as output from a large language model (LLM), an extracted page attribute from the text document. The extracted page attribute contains a first type of information recorded in text on a single page of the text document. The extracted document attribute contains a second type of information recorded in text on more than one page of the text document. The method obtains, as output from the LLM, an extracted document attribute from the text document. The extracted page attribute and the extracted document attribute are displayed in the UI.

20 Claims, 22 Drawing Sheets

(56) References Cited

U.S. PATENT DOCUMENTS

| 2024/0256764 A1* | 8/2024 | Maschmeyer | G06F 40/169 |
| 2024/0394291 A1* | 11/2024 | Nelson | G06F 40/30 |
| 2024/0411994 A1* | 12/2024 | Siracusano | G06F 40/205 |
| 2025/0307564 A1 | 10/2025 | Garcia | |
| 2025/0321995 A1* | 10/2025 | Jain | G06F 40/30 |
| 2025/0348740 A1* | 11/2025 | Zheng | G06N 3/0895 |
| 2025/0384380 A1 | 12/2025 | Inampudi | |
| 2026/0064741 A1* | 3/2026 | Wu | G06F 16/3344 |

* cited by examiner

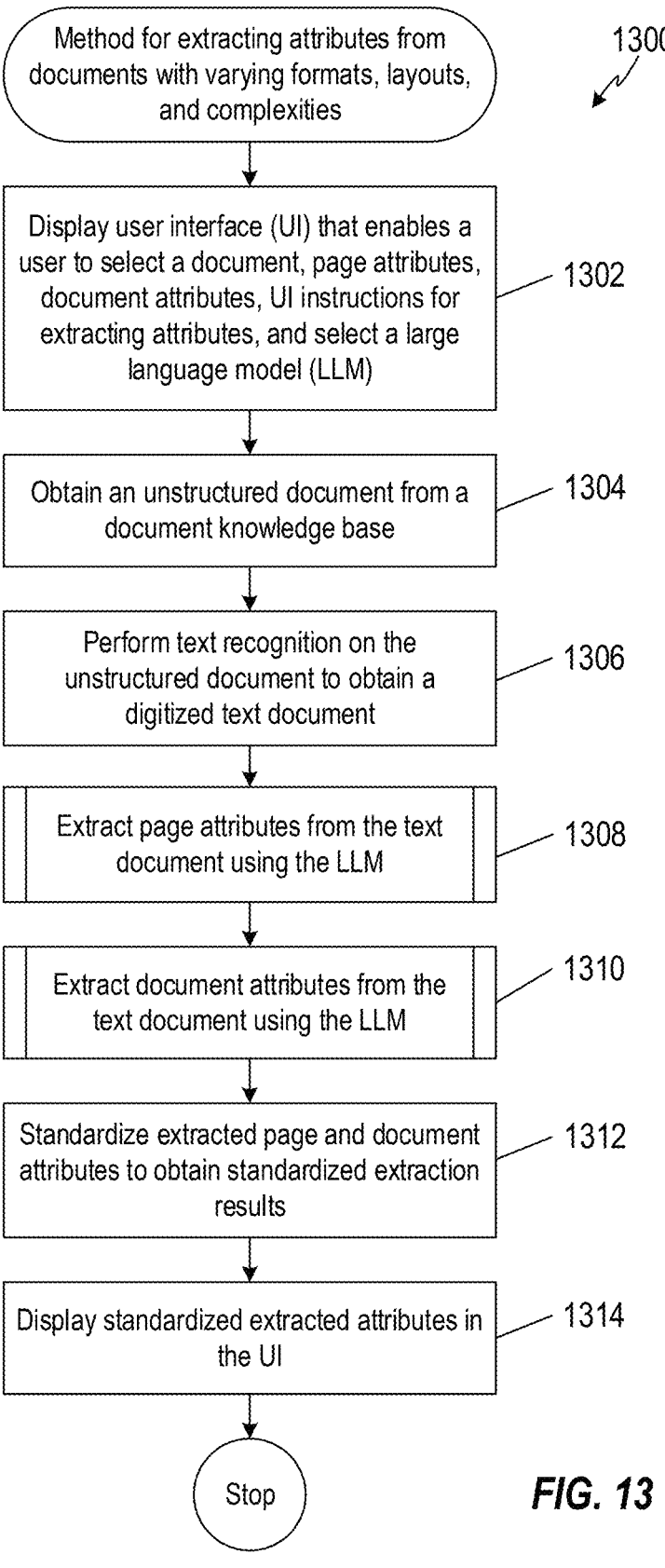

1300

Method for extracting attributes from documents with varying formats, layouts, and complexities Display user interface (UI) that enables a user to select a document, page attributes, document attributes, UI instructions for extracting attributes, and select a large language model (LLM) — 1302

Obtain an unstructured document from a document knowledge base — 1304

Perform text recognition on the unstructured document to obtain a digitized text document — 1306

Extract page attributes from the text document using the LLM — 1308

Extract document attributes from the text document using the LLM — 1310

Standardize extracted page and document attributes to obtain standardized extraction results — 1312

Display standardized extracted attributes in the UI — 1314

Stop

FIG. 13

METHOD AND SYSTEM FOR EXTRACTING INFORMATION FROM DOCUMENTS WITH VARYING FORMATS

BACKGROUND

Field

Aspects of the present disclosure relate to artificial intelligence, and in particular, to using artificial intelligence to extract information from documents stored in varying formats.

Description of Related Art

Documents are typically created with an application or a scanning device and can be stored in a variety of formats. A document created with a word processor application, a spreadsheet application, or a slide show application is referred to as a "native" document. Native documents are stored in a text document format, including DOC format, DOCX format, rich text format (RTF), and basic text file format (TXT). By contrast, a scanner or other optical device optically scans each page of a document and converts the full document into a single digital image. The resulting digital image of the original document is an unstructured document. Unstructured documents contain an image of text rather than the actual digital text of the native document. Unstructured documents can be stored in a variety of image formats, including Graphics Interchange Format (GIF), Joint Photographic Experts Group (JPEG), Portable Network Graphic (PNG), Portable Document Format (PDF), and Tag Image File Format (TIFF).

Although the contents of unstructured documents can be displayed on a display device and the text of the unstructured documents are readable to a viewer, typical search tools that can be used to search text of native documents cannot be used to search text of unstructured documents. For example, the PDF was developed as a presentation format that presents a document in its entirety, including layout, fonts, images, and interactive elements, across different software and hardware platforms. The PDF is used to save documents that cannot be modified but can be shared and printed. Native documents can be created and stored in the PDF using a word processor application. For example, Microsoft® Word® can be used to create a native document and store the native document in the PDF which preserves the digital text of the document. As a result, the text of native documents stored in the PDF using a word processor application can be searched using conventional search tools, such as Adobe® Reader®. By contrast, because the text of unstructured documents stored in the PDF are images of the text of the native document, the images of text cannot be searched using conventional search tools.

Organizations often generate native documents that are printed for people to read. Rather than keep paper copies of the documents, the native documents are scanned and saved as unstructured documents in a data store for reference at a later time. Typical unstructured documents are much longer than a single page. Many unstructured documents saved in a data store may have tens to hundreds of pages. A user may be able to retrieve an unstructured document from the data store to view the contents on a monitor or other display device. However, because the document has been scanned, a typical search tool cannot be used to search the document for particular content.

SUMMARY

One aspect provides a method for extracting attributes from documents with varying formats, layouts and complexities. In particular, the method displays a user interface (UI) that enables a user to obtain an unstructured document from a knowledge base, input a page attribute, input a document attribute, and input UI instructions. The unstructured document is converted into a text document using a text recognition engine. The method obtains, as output from a large language model (LLM), an extracted page attribute from the text document based on the text document, the page attribute, and the UI instructions input to the LLM. The method obtains, as output from the LLM, an extracted document attribute from the text document based on the text document, the document attribute, and the UI instructions input to the LLM. The extracted page attribute and the extracted document attribute are displayed in the UI. The extracted page attribute contains a first type of information recorded in text on a single page of the text document. The extracted document attribute contains a second type of information recorded in text on more than one page of the text document.

In another aspect provides an apparatus for extracting attributes from documents with varying formats, layouts and complexities. The apparatus comprises a text recognition engine configured to convert an unstructured document into a text document. The apparatus comprises a page-attribute extraction engine configured to use a large language model (LLM) to extract page attributes from the text document. Each extracted page attribute from is a first type of information recorded in text on a single page of the text document. The apparatus comprises a document-attribute extraction engine configured to use the LLM to extract document attributes from the text document. Each extracted document attribute is a second type of information recorded in text on more than one page of the text document. The apparatus comprises an aggregation engine configured to combine the extracted page attributes and the extracted document attributes into aggregated extracted page attributes and extracted document attributes. The apparatus comprises a user interface (UI) displayed on a display device. The UI is configured to display the aggregated extracted page attributes and extracted document attributes.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 13 depicts a flow diagram of a method for extracting attributes from documents with varying formats, layouts, and complexities.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
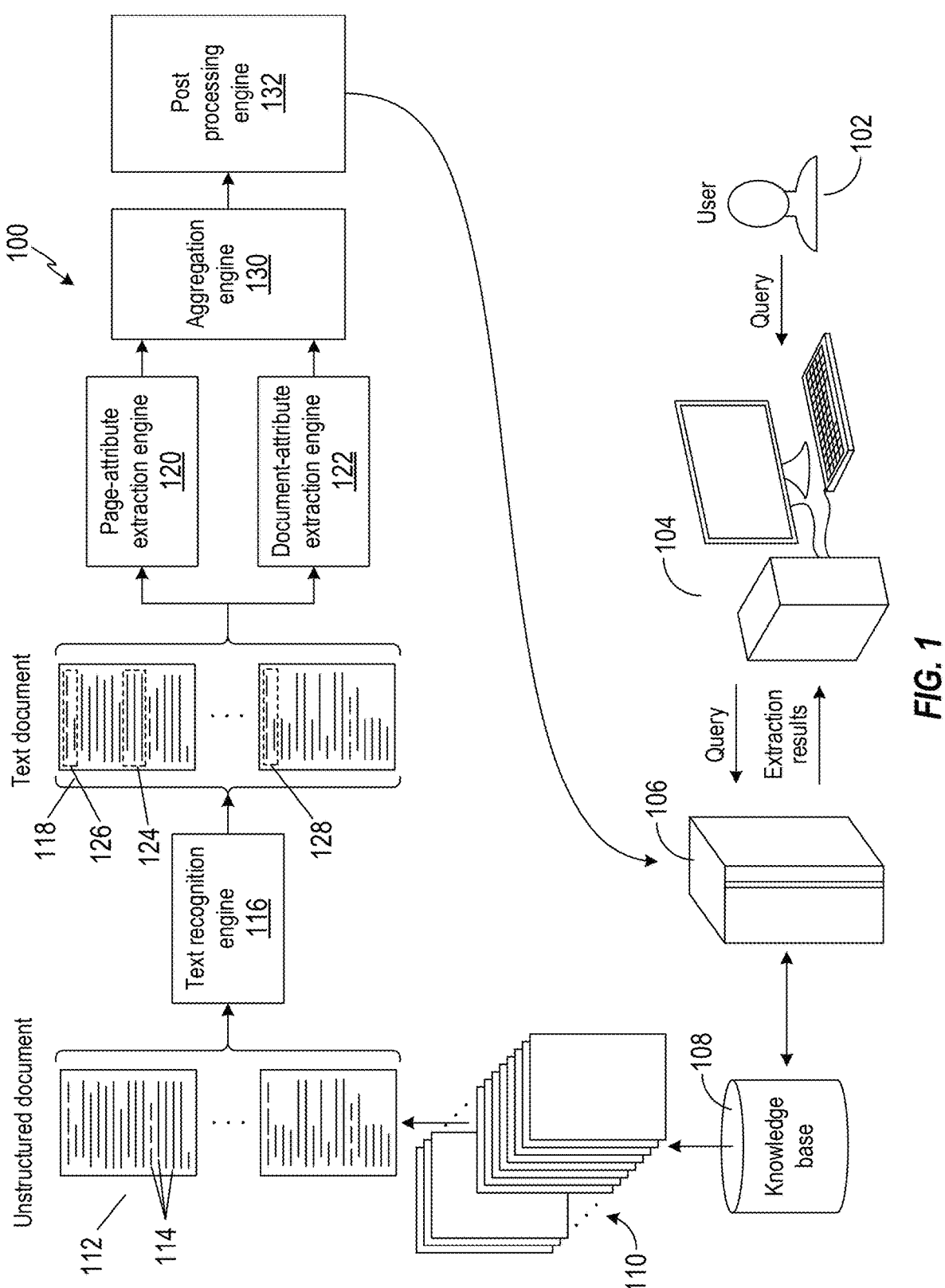
FIG. 1 depicts a high-level view of an example process for extracting information from unstructured documents stored in a knowledge base.

In recent years, organizations have increasingly moved away from storing physical documents in physical filing systems and archives. The documents are scanned or otherwise imaged to obtain digital images of text called "unstructured documents" that are stored electronically in a data store. However, typical text extraction tools cannot be used to reliably search and extract particular pieces of information, such as lines of text, characters, or numbers, from unstructured documents. For example, typical text extraction tools that have been developed for searching and aiding with the extraction of information from unstructured documents include text clean up, key word matching, heuristic search techniques based on layout, or traditional natural language processing (NLP) models.

However, these search and extraction tools cannot be applied to any unstructured document. These text extraction tools were created to handle specific types of unstructured documents and cannot be used to handle any unstructured document with varying and complex layouts and in any image format. For example, NLP tools require extensive supervised learning in which humans have to intervene by labeling large quantities of data used to train the models. The technical problems created by the diversity of unstructured document formats require advanced techniques and tools for accurate and reliable text extraction. Overcoming these technical problems is essential for effectively accessing the wealth of information and extracting particular pieces of information recorded in unstructured documents.

Certain aspects of methods, systems, and apparatuses described herein provide a technical solution to the above described technical problems with traditional text extraction tools by incorporating artificial intelligence (AI) large language models (LLMs) to extract information from any unstructured documents. The methods, systems, and apparatuses described herein automate extraction of information from unstructured documents in any type of image format, such as GIF, JPEG, PNG, PDF, and TIFF. In particular, the methods, systems, and apparatuses described herein allow a user to select an unstructured document from a knowledge base of unstructured documents. The unstructured documents may vary in length ranging from a single page to hundreds of pages (or more) and may vary in layout and have other complex issues, such as the pages may be slightly skewed and/or have uneven shading created by a scanner. The methods, systems, and apparatuses described herein convert an unstructured document selected by the user to a text document in a digital text format. The user can select page-level information and document-level information to extract from the text document and create additional instructions regarding the type of information to be extracted from the text document. The methods, systems, and apparatuses described herein create a prompt based on the page-level information, document-level information, and the additional instructions. The prompt and text document are input to the LLM. The LLM uses the prompt to extract text from the text document that matches the page-level and document-level information and satisfies the instructions regarding the type of information to be extracted. The extracted information can be converted into a structured format, such as JSON format, for use by other programs and algorithms.

The methods, systems, and apparatuses described herein provide a novel end-to-end process for extracting user selected information from unstructured documents. Unlike existing techniques for extracting information, the methods, systems, and apparatuses described herein perform information extraction without any human intervention. The methods, systems, and apparatuses receive user-selected page-level and document-level attributes and user-selected instructions, form prompts from prompt templates based on the page-level attributes, document-level attributes, and instructions, and input the prompts to the LLM. The prompts input to the LLM improve the LLM's performance by enabling the LLM to accurately identify and extract the page-level and document-level information requested by the user.

Example Method for Extracting Attributes from Documents with Varying Formats, Layouts, and Complexities FIG. 1 depicts a high-level view 100 of an example process for extracting information from unstructured documents stored in a knowledge base. In the example of FIG. 1, a user 102 submits a query for information via a user interface (UI) running on a computer system 104. The UI forwards the query to a computer server 106 that may be located on the premises of an organization or in the cloud. The UI may be provided by a web browser or an application running on the computer system 104. The UI can also be run on a tablet (not shown) or a smart mobile device (not shown). The UI allows the user 102 to select a document stored in a knowledge base 108 for extraction of information in accordance with the query submitted by the user 102. An example UI is described below with reference to FIG. 2. The knowledge base 108 is a data store that serves as a repository of documents 110 of the organization. The documents 110 can be reports, letters, contracts, memoranda, proposals, emails, technical descriptions, lab reports, survey results, manuals, notes, and other types of written material produced by people of the organization. The documents 110 can be native documents and unstructured documents.

In FIG. 1, the user 102 has selected an unstructured document 112 from the documents 110 via the UI. Horizontal lines, such as horizontal lines 114, represent words, numbers, and sentences contained in the unstructured document 112 that the user 102 can view in the UI. The unstructured document 112 can be a scanned document or other type of image of text in any one of many image formats, including GIF, JPG, PNG, PDF, and TIFF. The process executed by the computer server 106 includes a text recognition engine 116 that receives as input the unstructured document 112 and coverts the unstructured document 112 into a text document 118. The text document 118 is in a text document format and contains the same words, numbers, characters, and character strings of the image of text in the unstructured document 112.

In one aspect, the text recognition engine 116 can be an optical character recognition (OCR) engine that converts the image of text, such as typed text, handwritten text, or printed text, into the text of the text document 118.

In another aspect, the text recognition engine 116 can be a PDF parser engine that converts the image of text in the unstructured document 112 into a PDF that contains text and not the image of text. As a result, the text of the text document 118 is in the PDF but is not an image of text.

As discussed below with reference to FIG. 2, the UI enables the user 102 to select page attributes and document attributes to extract from the unstructured document 112. An attribute is a piece of information contained in the text document 118. An attribute can be lines of text, a string of characters, numbers, or alphanumeric characters. A page attribute contains a piece of information recorded in text on a single page of the text document 118. By contrast, a document attribute contains a piece of information recorded in text on more than one page of the text document 118.

In FIG. 1, the process executed by the computer server 106 includes a page-attribute extraction engine 120 and a document-attribute extraction engine 122. The page-attribute extraction engine 120 and the document-attribute extraction engine 122 use a large-language model (LLM) to extract page attributes and document attributes from the text document 118. The LLM is an artificial intelligence (AI) model that can recognize text and generate text. The LLM can be a type of neural network called a transformer model. For example, the LLM can be generative pre-trained transformer (GPT) model or a bidirectional encoder representations transformer (BERT) model.

The page-attribute extraction engine 120 extracts page attributes from the text document 118 in response to page attributes identified in the query submitted by the user 102 to the UI. For each page of the text document 118, the page-attribute extraction engine 120 extracts attributes of the page in response to the page attributes in the query submitted by the user 102. For example, the page-attribute extraction engine 120 extracts an attribute composed of text outlined by a dashed-line rectangle 124 from the first page of the text document 118. At the page level, the attributes extracted from the text document 118 are called "extracted page attributes." The extracted page attributes may be different and certain pages of the text document 118 may contain no page attributes selected by the user 102. An example implementation of the page-attribute extraction engine 120 is described below with reference to FIGS. 3A-3B.

The document-attribute extraction engine 122 extracts document attributes from the text document 118 in a response to document attributes identified in the query submitted by the user 102 to the UI. The document-attribute extraction engine 122 extracts an attribute outlined by dashed-line rectangles 126 and 128. In this example, the attribute appears on each page of the text document 118. At the document level, the attributes extracted from the text document 118 are called "extracted document attributes." An extracted document attribute is typically found on many pages of the text document 118 and certain pages of the text document 118 may contain no document attributes. Various example implementations of the document-attribute extraction engine 122 are described below with reference to FIGS. 4A-11B.

The process in FIG. 1 includes an aggregation engine 130 that aggregates the extracted page attributes and the extracted document attributes to form a response to the query submitted by the user 102. The aggregated extracted page attributes and the extracted document attributes are displayed in the UI as described below with reference to FIG. 12.

The process in FIG. 1 includes a post processing engine 132 that standardizes the extracted aggregated extracted page attributes and the extracted document attributes into a structured format. For example, the post processing engine 132 can standardize the aggregated page attributes and the document attributes into a text-based format, such as the JavaScript® Object Notation (JSON) format. The JSON format is syntactically similar to the code for creating JavaScript® objects. As a result, a JavaScript® program can convert the page attributes and the document attributes in the JSON format into JavaScript objects. In addition, the JSON format is text only, which can be sent between computers and used in any programming language.

User Interface Input

Figure 2:
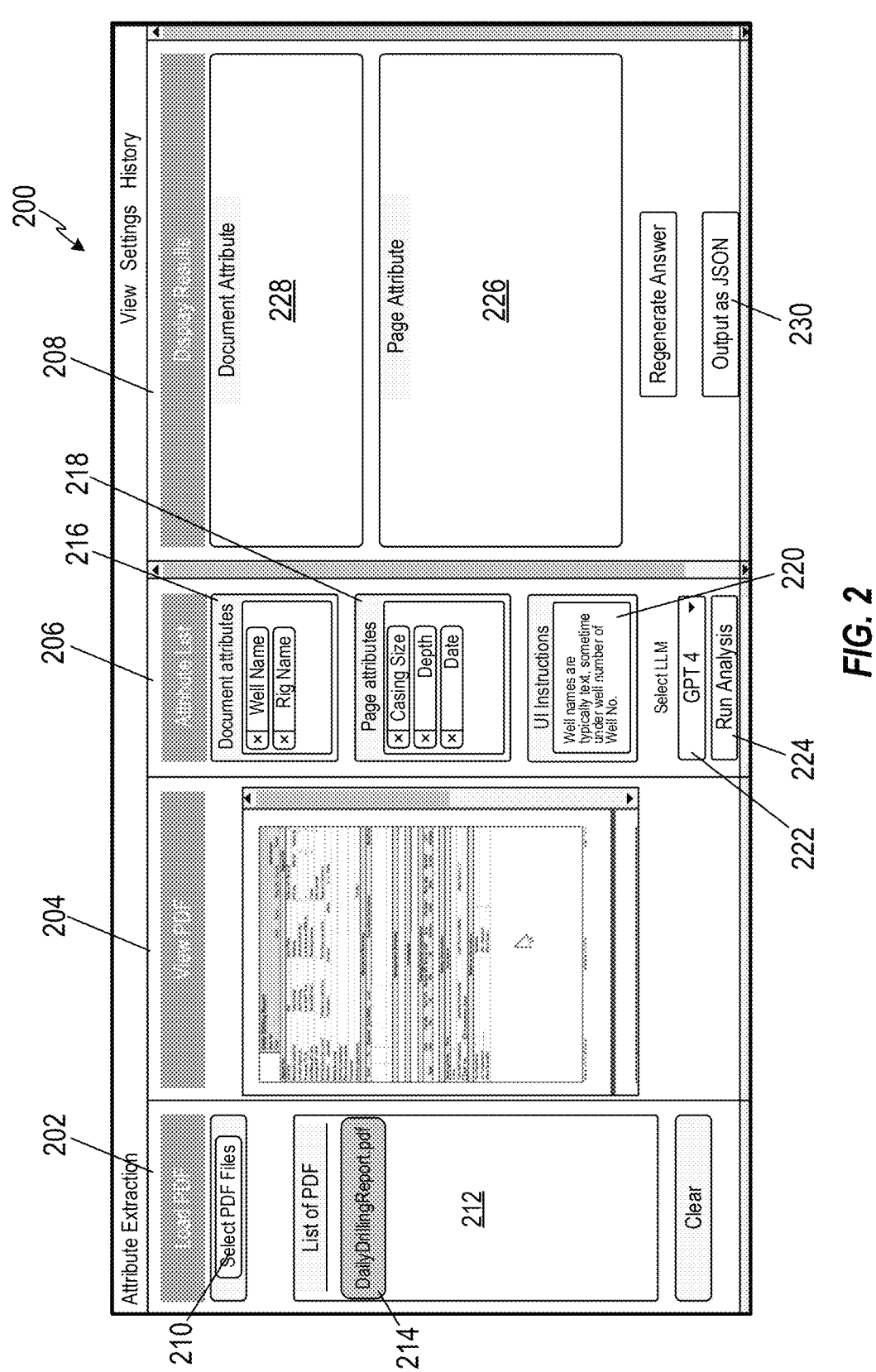
FIG. 2 depicts an example user interface (UI) that can be used to retrieve a document from the knowledge base, view the document, and submit a query to extract information from the document.

FIG. 2 depicts an example UI 200 the user 102 can use to retrieve a document the user has permission to access from the knowledge base 108, view the document, and submit a query to extract attributes from the document. The example UI 200 includes a loading pane 202 for selecting a document for loading from the knowledge base 108, a viewing pane 204 for viewing the document selected in the loading pane 202, a query input pane 206, and a display results pane 208.

The loading pane 202 includes a button 210 that enables the user 102 to select a document format. In this example, the user 102 has selected PDF files. After the user selects PDF files, a list of documents pane 212 is populated with names of unstructured documents in the PDF. In this example, the list of documents pane 212 contains the name of an unstructured document 214. An image of the text of the unstructured document is displayed in the viewing pane 204. In this example, the unstructured document displayed in the viewing pane 204 is a scanned daily drilling report selected by the user 102. Other types of native and unstructured documents that can be retrieved from the knowledge base 108 and displayed in the viewing pane 204 include, but are not limited to, letters (e.g., handwritten or typed), contracts, memoranda, proposals, emails, technical descriptions, lab reports, survey results, manuals, and notes. The query input pane 206 includes a document attributes window 216 that enables the user 102 to select document attributes; a page attributes window 218 that enables the user 102 to select page attributes; and an instructions window 220 that enables the user 102 into input UI instructions for extracting page and document attributes from the unstructured document selected by the user 102. The user 102 can select from templates of UI instructions or the user can type in specific UI instructions. The query input pane 206 includes a field 222 that enables the user 102 to select the LLM that is used by the page-attribute extraction engine 120 and the document-attribute extraction engine 122 to extract attributes from the unstructured document displayed in the viewing pane 204. In this example, the user 102 has selected the GPT 4 model. The query input pane 206 includes a run analysis button 224 that the user 102 clicks on to start execution of the page-attribute extraction engine 120 and the document-attribute extraction engine 122 to extract attributes from the unstructured document the viewing pane 204.

The extraction results obtained by the page-attribute extraction engine 120 are displayed in the page attributes window 226 of the display results pane 208. The extracted document attributes obtained by the document-attribute extraction engine 122 are displayed in the document attribute window 228 of the display results pane 208. Display results pane 208 includes a button 230 that executes the post processing engine 132 to convert the extracted page attributes and extracted document attributes results from tabular format into the JSON format.

Page-Attribute Extraction

The page-attribute extraction engine 120 creates a prompt from a prompt template for extracting page attributes from each page of the text document 118. Each prompt includes a different page of text from the text document 118, the page attributes and UI instructions input by the user 102 via the UI, and a natural language expression directing the LLM to extract text from the page that matches the page attributes and satisfies the UI instructions.

Figure 3A:
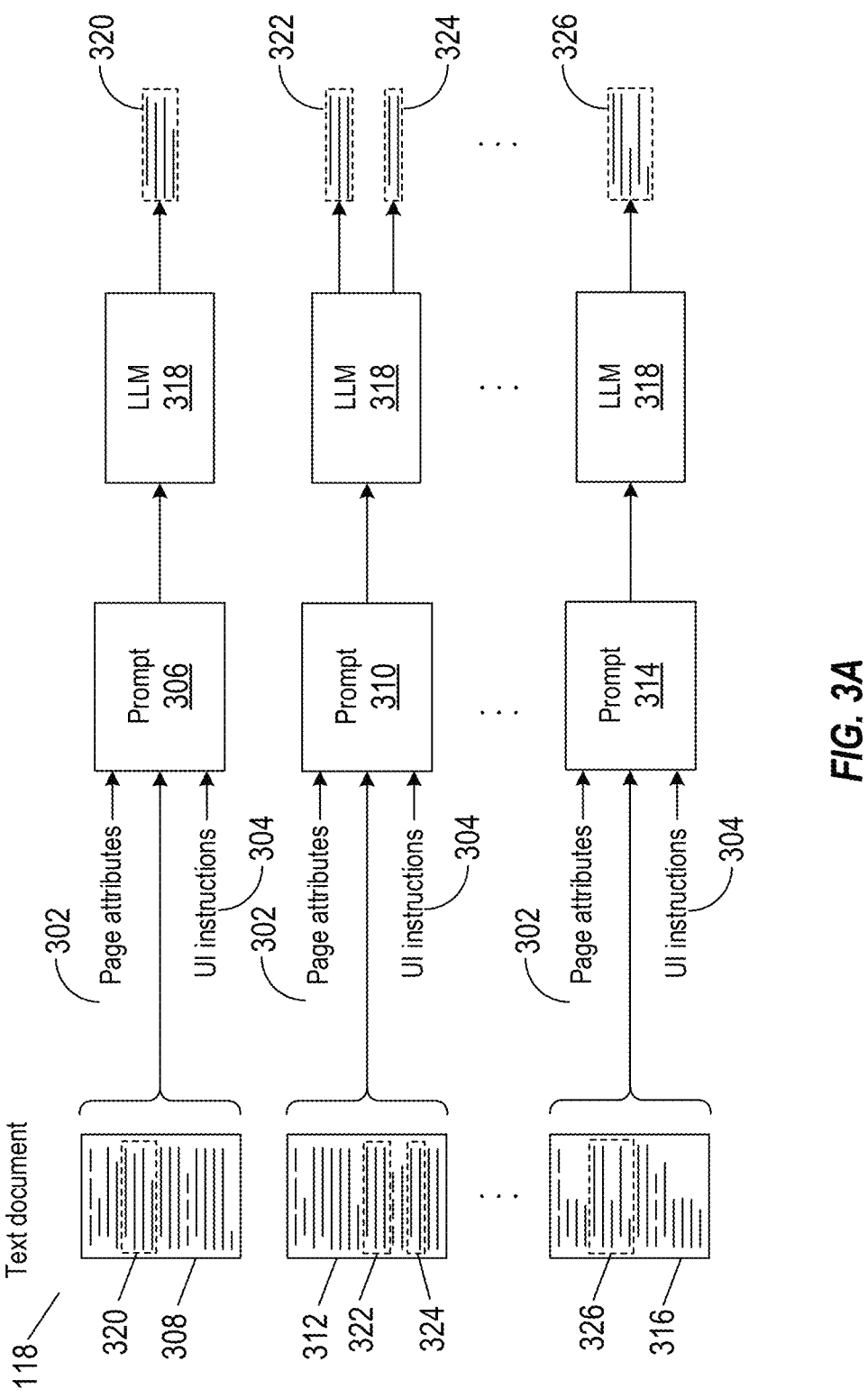
FIGS. 3A-3B depict an example of page-attribute extraction from a text document.

FIG. 3A depicts an example of page-attribute extraction from the text document 118 as performed by the page-attribute extraction engine 120. For each page of the text document 118, a respective prompt is created from the page attributes 302 and UI instructions 304 input by the user 102 via the UI, as described above with reference to FIG. 2, and the content of the respective page of the text document 118. For example, a first prompt 306 is created from the page attributes 302 and the UI instructions 304 and the text of the first page 308. A second prompt 310 is created from the page attributes 302 and the UI instructions 304 and the text of the second page 312. A final prompt 314 is created from the page attributes 302 and the UI instructions 304 and the text of the final page 316. The prompts are separately input to the LLM 318 to extract text from the respective pages that match the page attributes 302 and satisfies the UI instructions 304. For example, the LLM 318 extracts the text 320 from the first page 308. The LLM 318 extracts the text 322 and the text 324 from the second page 312. The LLM 318 extracts the text 326 from the final page 316.

Note that not every page of the text document 118 is expected to have text that matches the page attributes or satisfies the UI instructions. The LLM 318 does not extract text from pages of the text document 118 that do match the page attributes or satisfy the UI instructions.

Figure 3B:
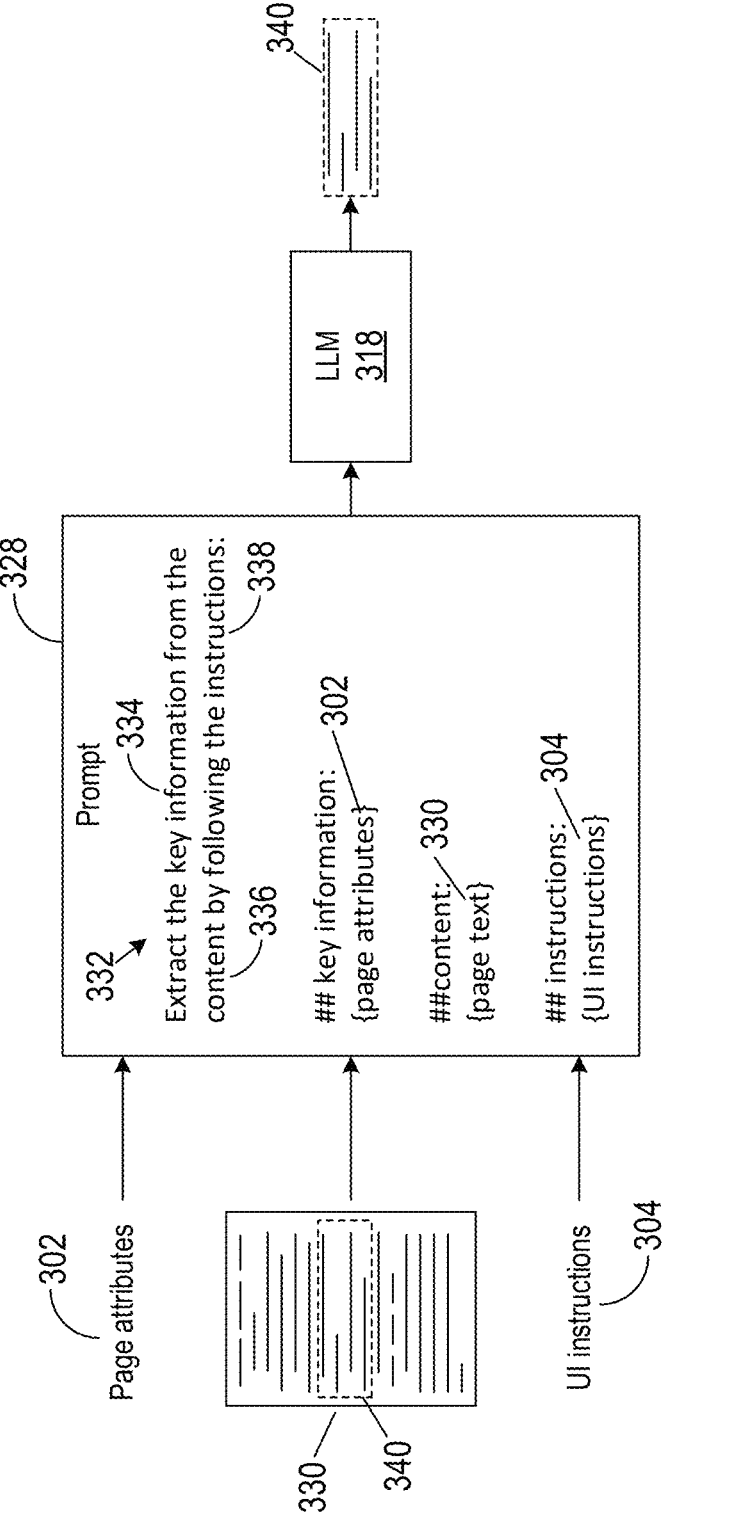

FIG. 3B depicts an example prompt 328 that can be used to input the page attributes 302, the UI instructions 304, and text of a page 330 of the text document 118 into the LLM 318. The prompt 328 includes an instruction 332 to extract information. In this example, the prompt 328 includes hashtags that are used to expound on the content of certain words in the instruction 332. For example, a hashtag of the word "key information" 334 in the instruction 332 comprises the page attributes 302; a hashtag of the word "content" 336 in the instruction 332 comprises the text of the page 330; and the hashtag of the word "instructions" 338 comprises the UI instructions 304. The prompt 328 is input to the LLM 318. If the page 330 contains text that matches the page attributes 302 and satisfies the UI instructions 304, the LLM 318 extracts the text from the page 330 and outputs the text. In this example, the LLM 318 has extracted the text enclosed by dashed-line rectangle 340.

Document-Attribute Extraction

The document-attribute extraction engine 122 creates a prompt from a prompt template for extracting document attributes from the text document 118. The manner in which text is extracted from the text document 118 is determined by the number of characters or tokens in the text document 118 and the character limit of the LLM 318. The character limit of an LLM is the number of characters or tokens that are shared between the input and the output of the LLM. In some aspects, the character limit of the LLM 318 can be around 5,000 characters. In other aspects, the character limit of the LLM 318 can be around 10,000 characters. If the number of characters of the text document 118, the document attributes, the UI instructions, and the expected or approximate number of characters in the extracted attributes output from the LLM 318 are less than the character limit of the LLM 318, the prompt input to the LLM 318 can be formed from the full text of the text document 118, the document attributes, and UI instructions input by the user 102 and input to the LLM 318 as described below with reference to FIGS. 4A-4B.

Figure 4A:
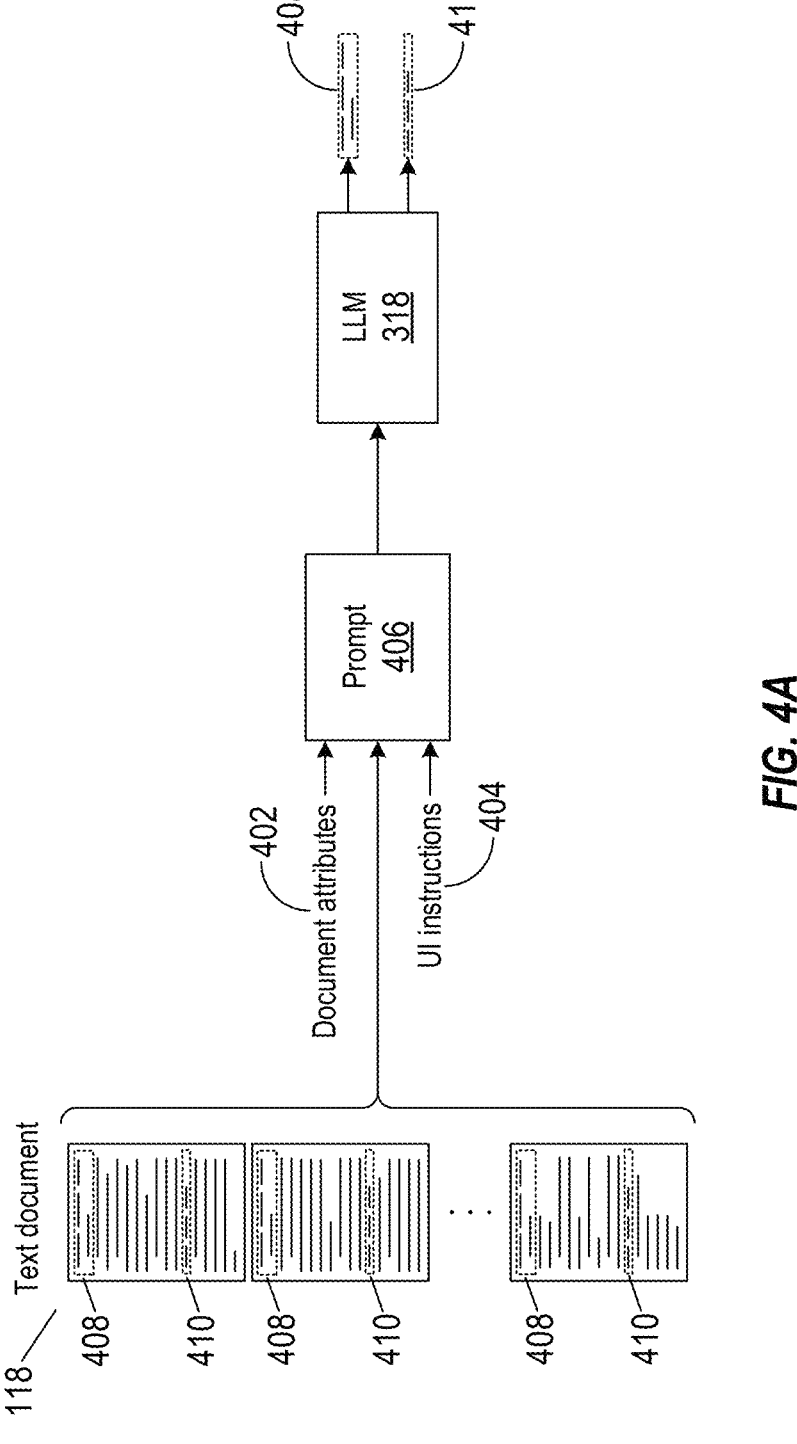
FIGS. 4A-4B depict an example of document-attribute extraction from a text document.

FIG. 4A depicts an example of document-attribute extraction from the text document 118 as performed by the document-attribute extraction engine 122. In this example, the number of characters of the full text of the text document 118, the document attributes 402, the UI instructions 404, and the expected extracted attributes are less than the character limit of the LLM 318. A prompt 406 is created from the text document 118, the document attributes 402, and the UI instructions 404 and is input to the LLM 318. The LLM 318 outputs an extracted document attribute composed of the text enclosed by dotted-line rectangles 408 and 410 from pages of the text document 118.

Figure 4B:
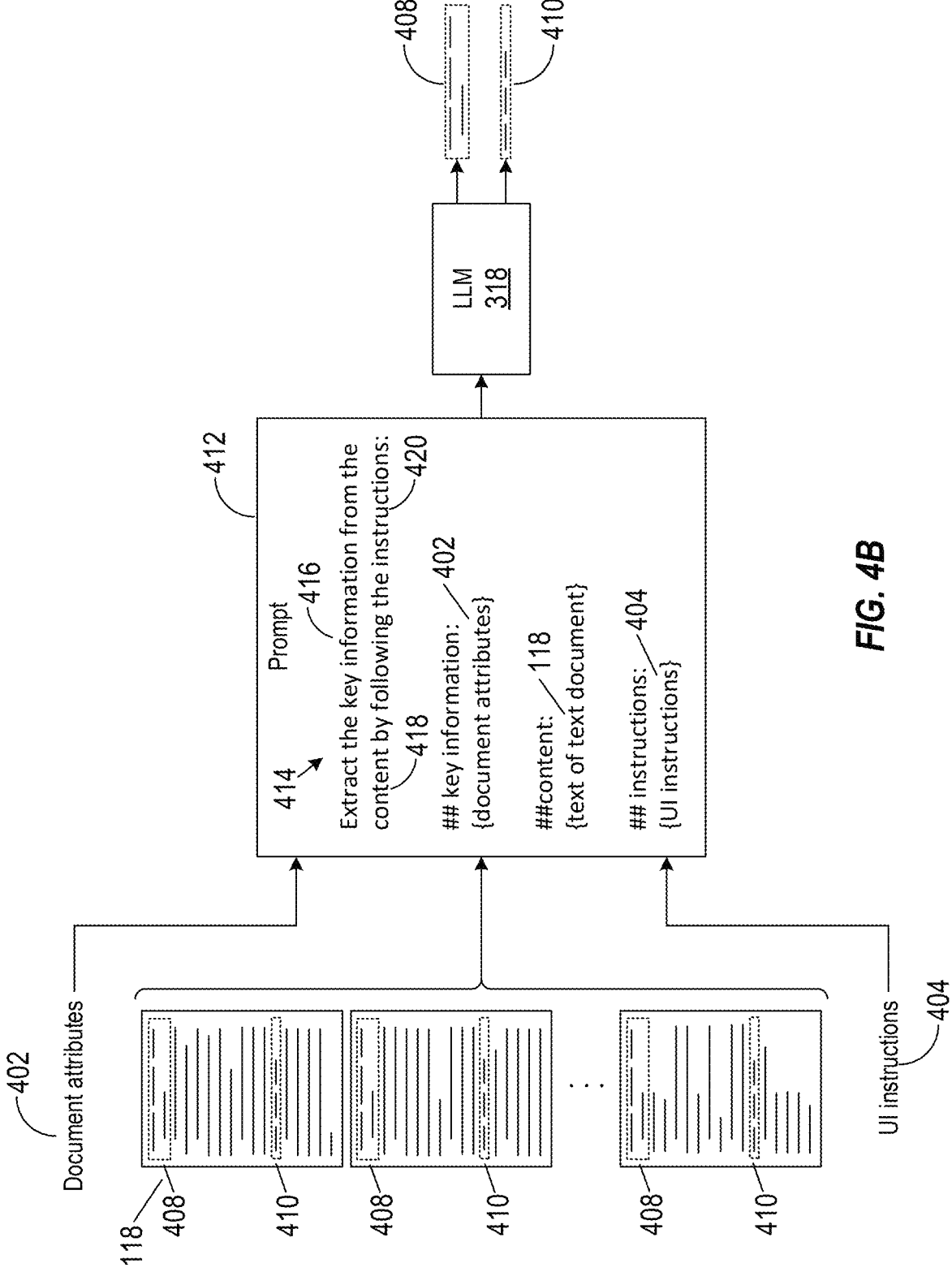

FIG. 4B depicts an example prompt 412 formed from the document attributes 402, the UI instructions 404, and the full text of the text document 118. The prompt 412 includes an instruction 414 to extract information. In this example, the hashtag of the word "key information" 416 in the instruction 414 comprises the document attributes 402; the hashtag of the word "content" 418 comprises the text of the text document 118; and the hashtag of the word "instructions" 420 comprises the UI instructions 404. The prompt 412 is input to the LLM 318. In this example, the LLM 318 has extracted the text enclosed by dotted-line rectangles 408 and 410.

In other aspects, if the number of characters or tokens in the text document 118, the document attributes, the UI instructions, and the expected or approximate number of characters in the extracted attributes output from the LLM 318 combined are greater than the character limit of the LLM 318, the document-attribute extraction engine 122 can divide the text of the text document (or chunking) into blocks (or chunks) of text. The blocks of text are embedded in vectors of an N-dimensional space. The blocks of text that are semantically similar to the query submitted by the user 102 are identified. A prompt that includes the blocks of text that are semantically similar to the query, the document attributes, and UI instructions input by the user 102 is input to the LLM 318 to obtain extracted document attributes as described below with reference to FIGS. 5-10B.

Figure 5:
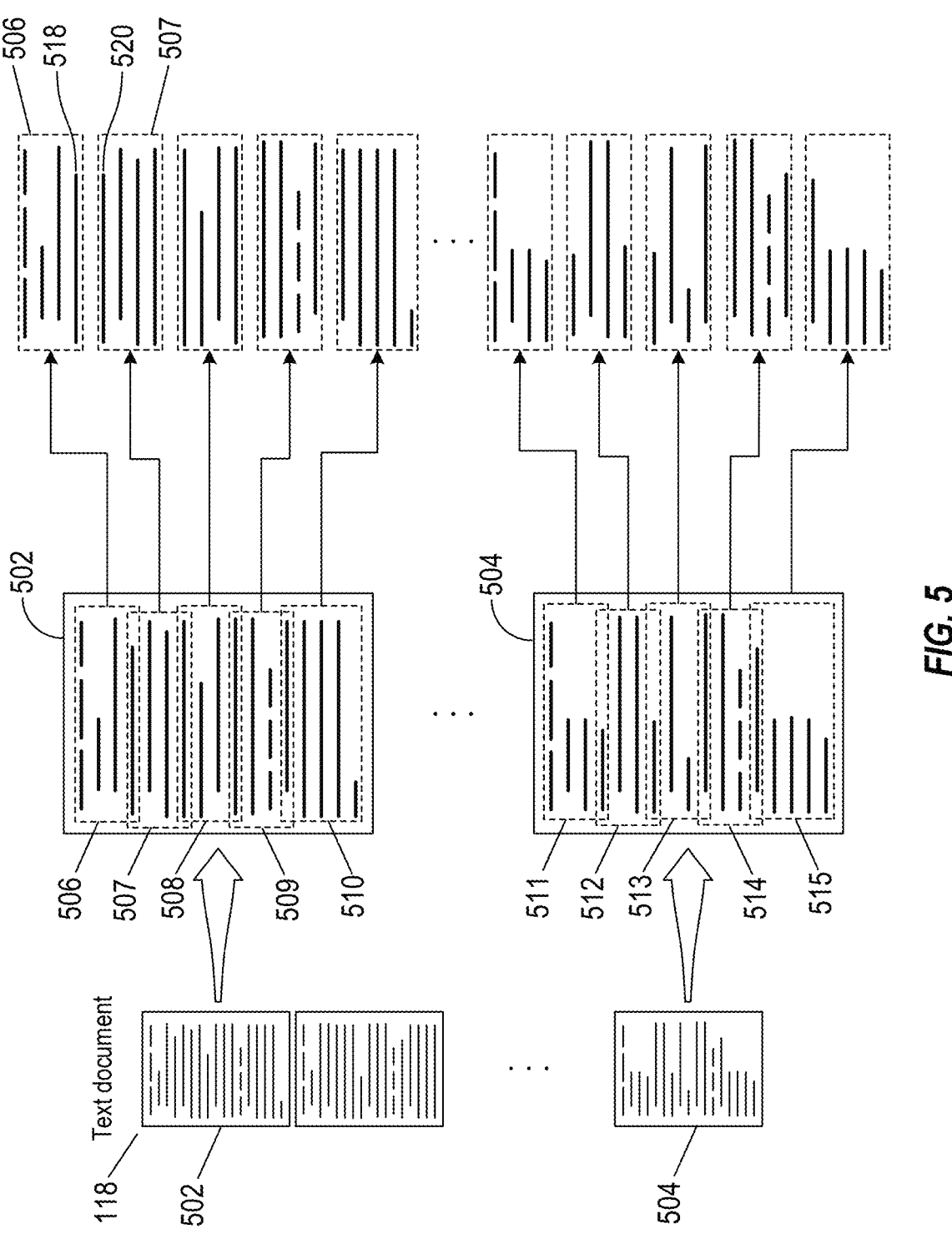
FIG. 5 depicts an example of dividing text of a text document into blocks of text.

FIG. 5 depicts an example of dividing the content of the text document 118 into blocks of text. In this example, the first page 502 and the last page 504 of the text document 118 are enlarged. Dashed-line rectangles 506-510 enclose overlapping blocks of text in the first page 502 and dashed-line rectangles 511-515 enclose overlapping blocks of text in the last page 504. The blocks of text are displayed separately. Each block of text contains text that overlaps with one or two neighboring blocks of text. For example, a line of text 518 of the block of text 506 is the same as a line of text 520 of the block of text 507.

Each block of text is composed of characters, such as ASCII characters. The number of characters in a block of text cannot exceed a character limit. For example, in certain implementations, the number of characters per block is limited to 500. In another implementation, the number of characters per block is limited to 1,000. In still other implementation, the number of characters per block is limited to 2,000. These are just some examples, and other limits are possible. Alternatively, blocks of text may be limited by the number of tokens. For example, in another implementation, the number of tokens per block is limited to 20. In another implementation, the number of tokens per block is limited to 30.

Each block of text is embedded in a vector of the N-dimensional space using vector embedding, such as Chroma®, Pinecone, or Facebook AI Similarity Search (FAISS). Each vector is denoted by $V_i=[x_{1i}, \ldots, x_{Ni}]$, where i is a positive integer vector index and $x_{ni}$ is a real number.

The query submitted by the user 102 via the UI is embedded into a query vector in the same N-dimensional space using the same embedding technique used to create the vector representations of the blocks of text. The query vector is denoted by $QV=[y_1, \ldots, y_N]$, where $y_n$ is a real number and n=1, . . . , N.

Figure 6:
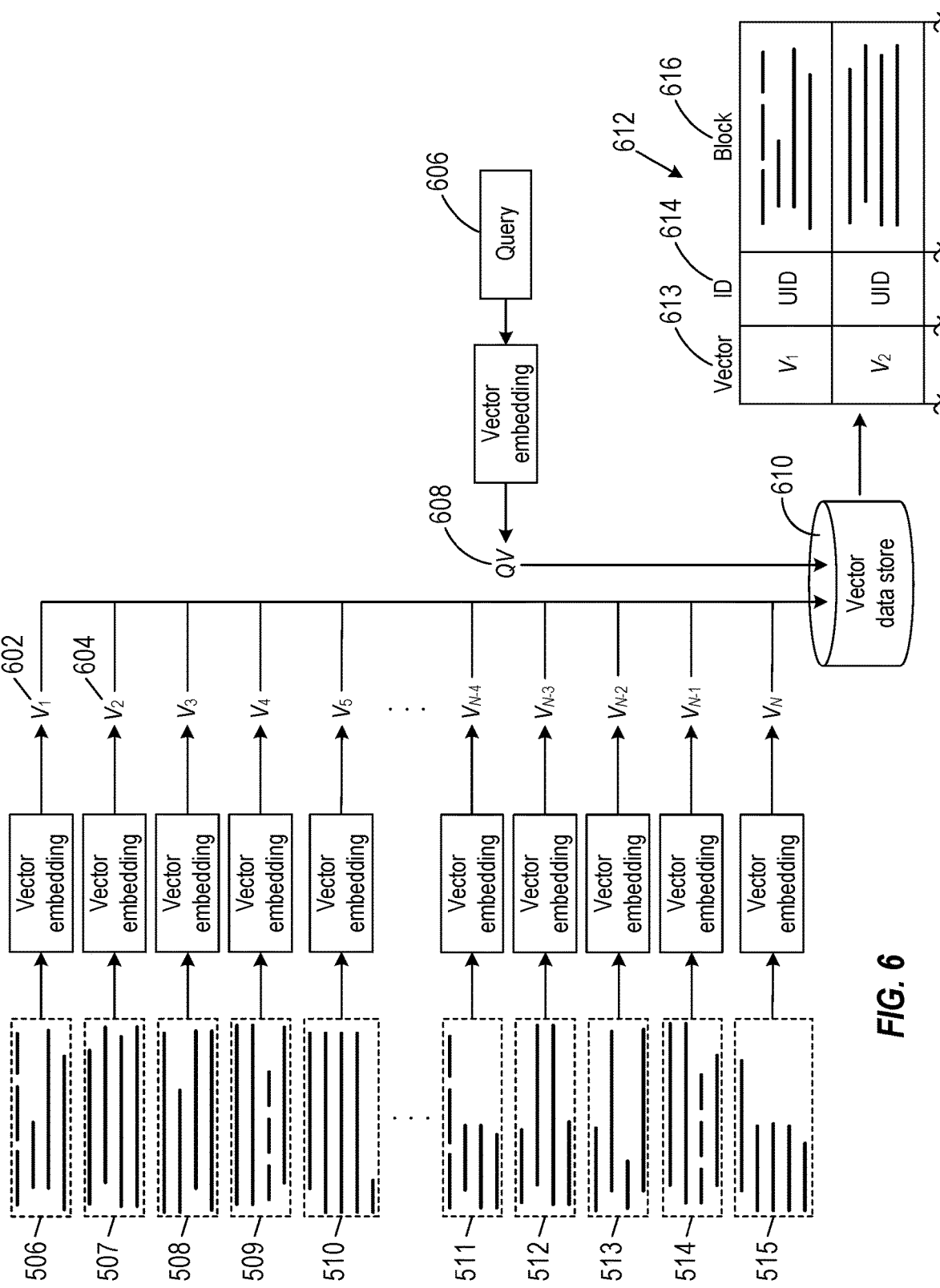
FIG. 6 depicts an example of embedding blocks of text of a text document and a query into corresponding vectors of an N-dimensional space.

FIG. 6 depicts an example of embedding the blocks of text of the text document 118 and the query submitted by the user 102 into corresponding vectors of an N-dimensional space. For example, the block of text 506 is embedded in a vector $V_1$ 602 and the block of text 507 is embedded in the vector $V_2$ 604. The query 606 comprises the document attributes and the UI instructions and is embedded in a query vector QV 608. The query vector 608 and vectors of corresponding blocks of text are stored in a vector data store 610. Table 612 represents the vectors and corresponding blocks of text stored in the vector data store 610. Column 613 contains the vector representations of the blocks of text. Column 614 contains the unique identifier of the text document 118 the vector was extracted from. Column 616 contains the block of text that corresponds to the vector.

In one aspect, cosine similarity can be used as a quantitative measure of the semantic similarity between the text of the query and the blocks of text based on the vector representations of the blocks of text and the query vector in the N-dimensional space. The terms "semantically similar" and "semantic similarity" refer to how close in meaning the text of the query is to the meaning of a block of text. The semantic similarity is quantitatively measured by computing the cosine of the angle between a vector representation of a block of text and the query vector regardless of the lengths of the corresponding vectors. A block of text and the text of the query are regarded as semantically similar (e.g., similar meaning) if the two corresponding vectors are pointing in roughly the same direction. By contrast, a block of text and the text of the query are regarded as not semantically similar if the two corresponding vectors point in largely different or opposing directions.

Figure 7:
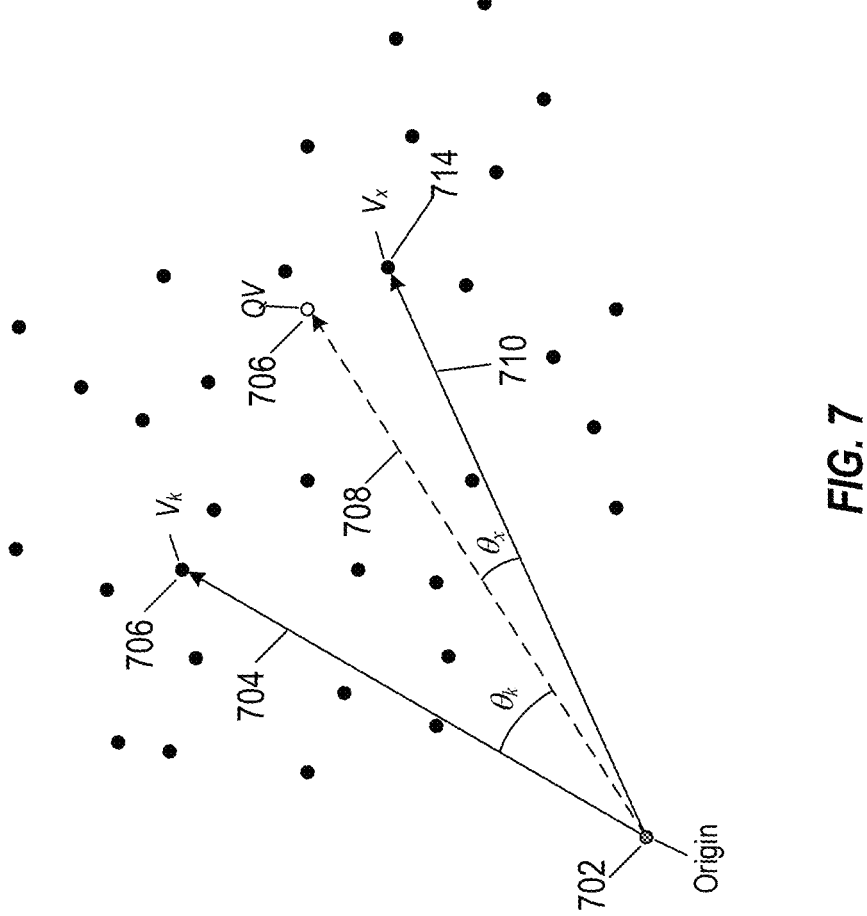
FIG. 7 depicts an example of identifying semantically similar blocks of text to text of a query.

FIG. 7 depicts an example of identifying semantically similar blocks of text to the text of the query. The N-dimensional vector representations of the blocks of text are represented by directional arrows emanating from an origin 702. For simplicity of illustration, the N-dimensional space is illustrated in 2-dimensions and only the end points of the vectors are represented by solid points. For example, vector, $V_k$, 704 represents a first block of text that ends at a point 706, and vector, $V_x$, 708 represents a second block of text that ends at a point 710. Dashed directional arrow represents the query vector, QV, 712 that ends at an open point 714.

The cosine similarity is calculated for each vector representation of the blocks of text and the query vector as follows:

$$\cos(\theta_i) = \frac{V_i \cdot QV}{\|V_i\|\|QV\|} \tag{1}$$

where
$\theta_i$ denotes the angle between the vector $V_i$ of a block of text and the query vector QV;
"•" denotes the scalar or dot product; and
$\|\cdot\|$ denotes the norm of a vector.
The cosine similarity ranges between −1 and 1 and measures the degree of semantic similarity between the blocks of text and the query. The closer the cosine similarity of the vectors $V_i$ and PV is to "1" (i.e., $\theta_i$ is to zero), the more semantical similar the corresponding text. The further the cosine similarity of the vectors $V_i$ and PV is away from "1" (i.e., $\theta_i>0$), the more dissimilar the corresponding text.

For example, in FIG. 7, the angle $\theta_x$ is the angle between the vector representation, $V_x$, of a block of text and the query vector QV, and the angle $\theta_k$ is the angle between the vector representation, $V_k$, of a block of text and the query vector QV. The cosine similarity between the vector $V_x$ 710 and the query vector QV 708 is closer to 1 than the cosine similarity between the vector $V_x$ 704 and the query vector QV 708 (i.e., $\theta_x<\theta_y$). The cosine similarity associated with each vector representation of a block of text is recorded in the vector data store 610. For example, the table entry for the vector $V_x$ includes an entry for the cosine similarity 716.

Figure 8:
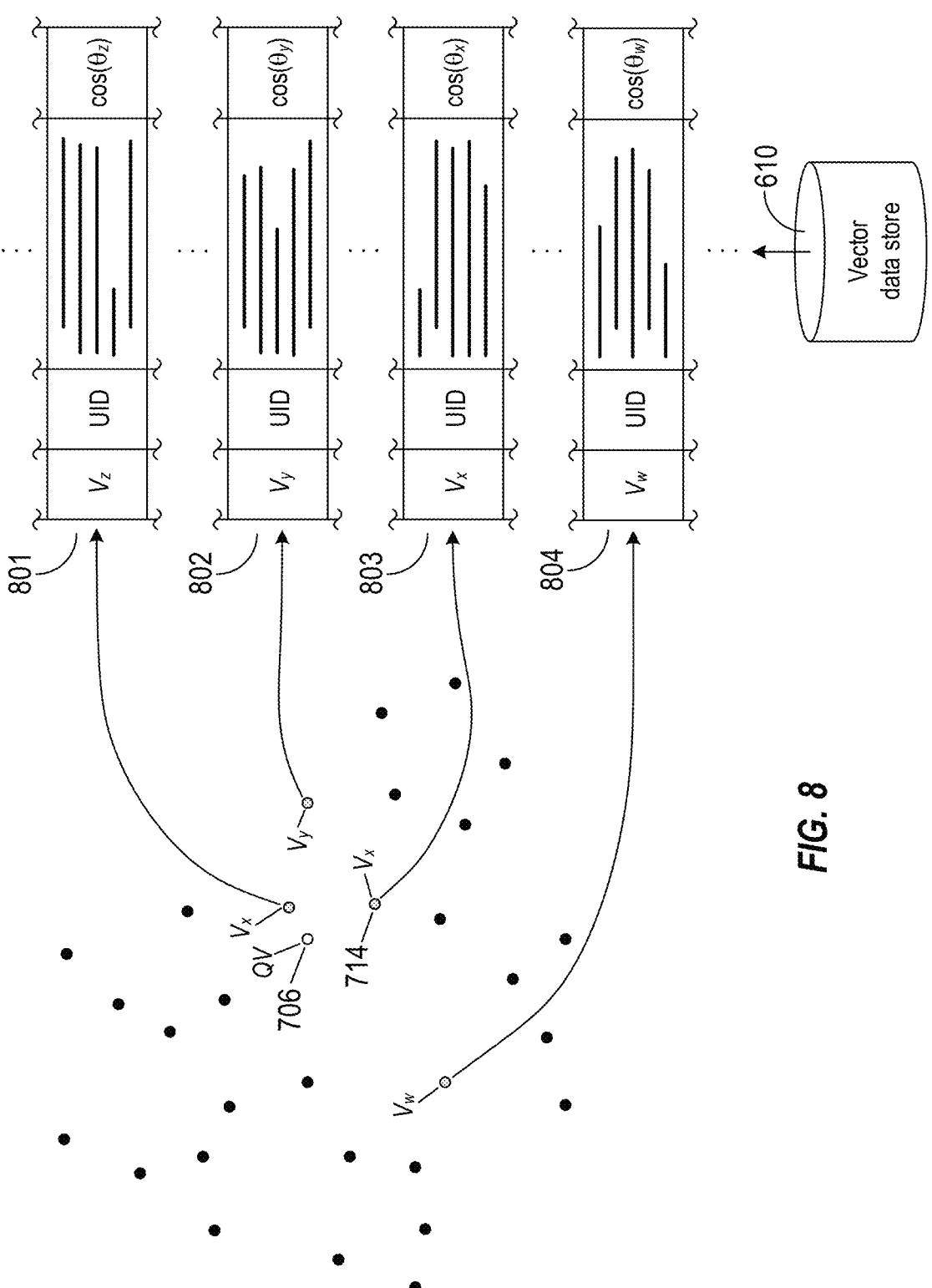
FIG. 8 depicts an example of four vectors with corresponding cosine similarities closest to a query vector.

FIG. 8 depicts an example of four vectors with corresponding cosine similarities closest to the query vector. The four vectors that represent four blocks of text that are the most semantically similar to the text of the query are denoted by $V_w, V_x, V_y$, and $V_z$. In FIG. 8, the vectors are represented by entries 801-804 in the table stored in the vector data store 610.

In one aspect, the blocks of text with vector representations having the K (e.g., K=3, 5, or 10) largest corresponding cosine similarities to the query vector can be identified as the K blocks of text that are candidates for forming a prompt.

The K blocks of text with the largest corresponding cosine similarities have the highest semantic similarity to the query.

In another aspect, the blocks of text may be identified using a similarity threshold, $Th_{sim}$. The similarity threshold can be used to identify the closest blocks of text to the query by only identifying blocks of text with corresponding cosine similarities that are greater than the similarity threshold. For example, $Th_{sim}$ can be set to 0.5, 0.7, or 0.9 for identifying the blocks of texts that are the most semantically similar to the query. The blocks of text with the corresponding cosine similarities greater than the similarity threshold have the highest semantic similarity to the query.

In another aspect, the technique of K-nearest neighbors can be used as a quantitative measure of the semantic similarity between the text of the query and the blocks of text based on the vector representations of the blocks of text and the query vector in the N-dimensional space. The K closest vector representations of the blocks of text to the query vector in the N-dimensional space are identified as semantically similar to the query vector. The K-nearest neighbor technique determines an optimum positive integer value for K-nearest neighbor vector representations of the blocks of text to the query vector. For example, an approximate query vector is calculated as an average of the K nearest vectors to the query vector for different values of K (e.g., K=1, 2, 3, 4, 5, 6, . . . ). The value of K with the smallest mean square error between the approximate query vectors and the query vector is the optimum K. The blocks of text with corresponding vectors for the optimum K are semantically similar to the query.

Figure 9:
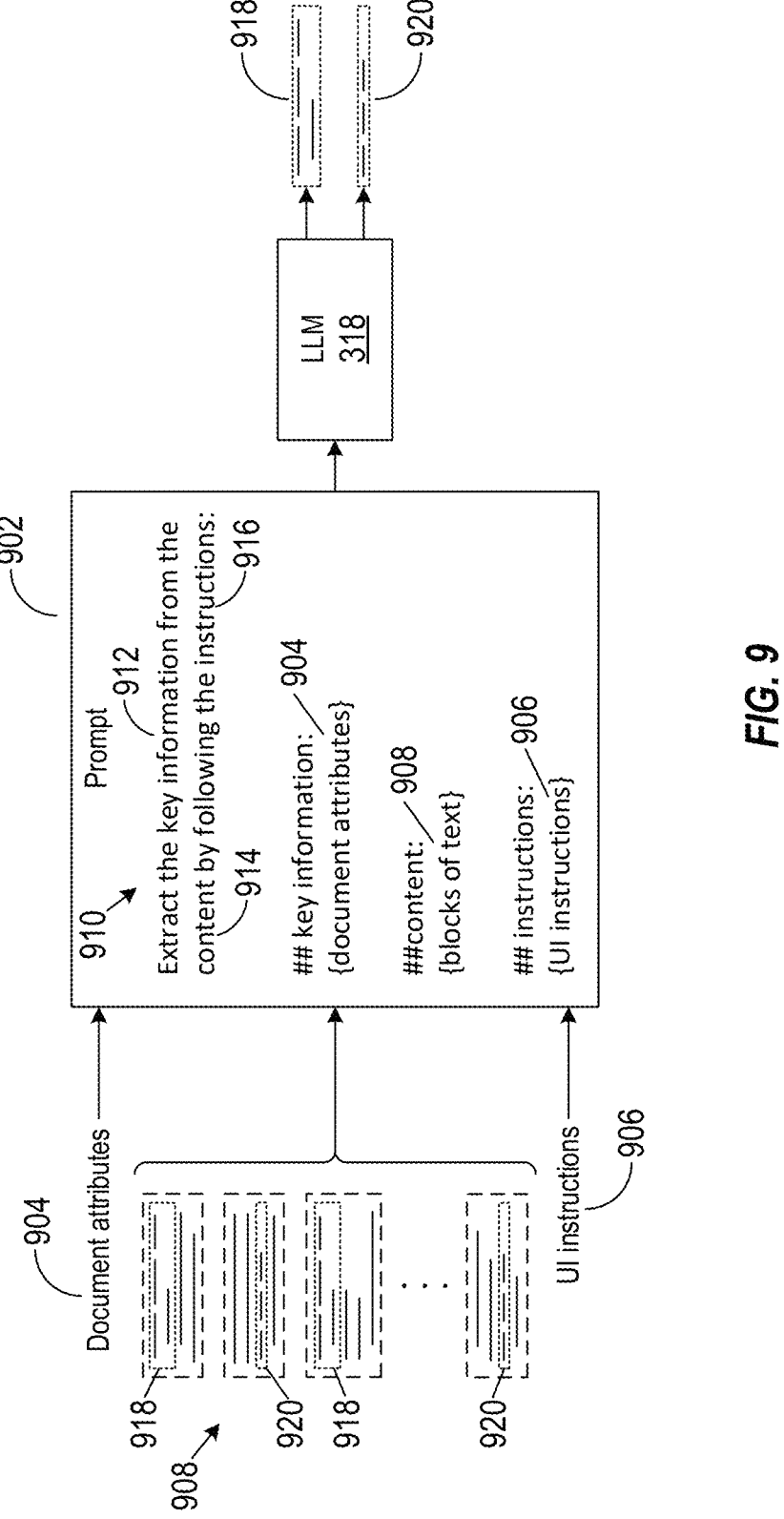
FIG. 9 depicts an example prompt that can be used to input document attributes, UI instructions, and blocks of text of a text document.

FIG. 9 depicts an example prompt 902 that can be used to input document attributes 904, UI instructions 906, and the blocks of text 908 of the text document 118 that are semantically similar to the query (e.g., the document attributes 904 and the UI instructions 906) submitted by the user 102. The prompt 902 includes an instruction 910 to extract information. In this example, the hashtag of the word "key information" 912 in the instruction 910 comprises the document attributes 904; the hashtag of the word "content" 914 in the instruction 910 comprises the blocks of text 908; and the hashtag of the word "instructions" 916 comprises the UI instructions 906. The prompt 902 is input to the LLM 318. In this example, the LLM 318 has extracted the text enclosed by dotted-line rectangles 918 and 920.

In other aspects, if the number of characters in the text document 118, the document attributes, the UI instructions, and an expected number of characters in the extracted attributes are greater than the character limit of the LLM 318, the document-attribute extraction engine 122 creates a prompt from a prompt template for extracting document attributes from each page of the text document 118. Each prompt includes the document attributes, the UI instructions input, and a different page of text from the text document 118. The prompt is input to the LLM 318 to extract the document attributes from the individual pages of the text document 118.

Figure 10A:
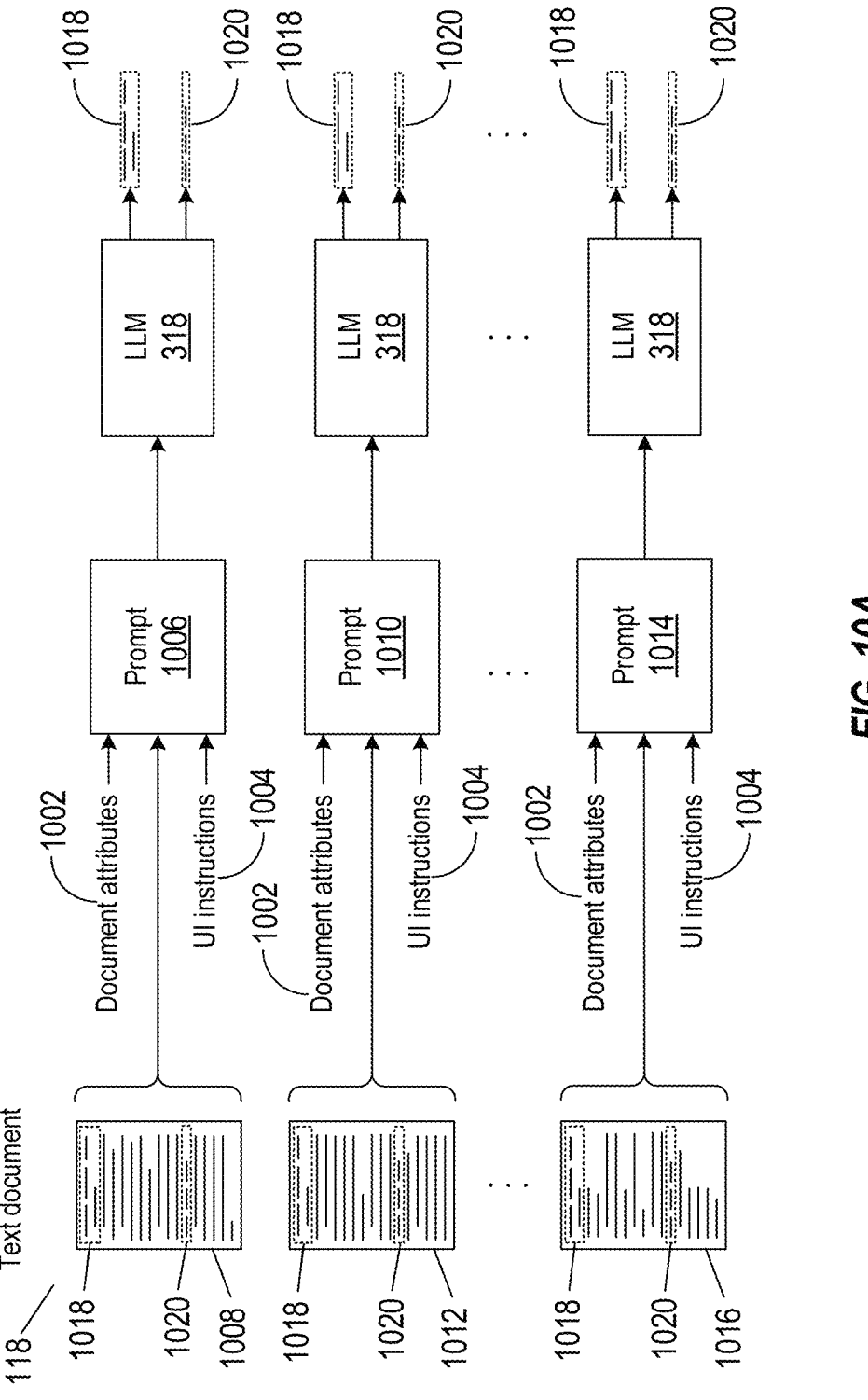
FIG. 10A depicts an example of document-attribute extraction from a text document.

FIG. 10A depicts an example of document-attribute extraction from the text document 118 as performed by the document-attribute extraction engine 122. For each page of the text document 118, a respective prompt is created from the document attributes 1002, UI instructions 1004, and the text of the respective page of the text document 118. For example, a first prompt 1006 is created from the document attributes 1002, the UI instructions 1004, and the text of the first page 1008. A second prompt 1010 is created from the document attributes 1002, the UI instructions 1004, and the text of the second page 1012. A final prompt 1014 is created from the document attributes 1002, the UI instructions 1004, and the text of the final page 1016. The prompts are separately input to the LLM 318 to obtain extracted document attributes that match the document attributes 1002 and satisfies the UI instructions 1004 from the respective pages. In this example, the LLM 318 extracts the text enclosed by dotted-line rectangles 1018 and 1020 from each of the pages of the text document 118.

Figure 10B:
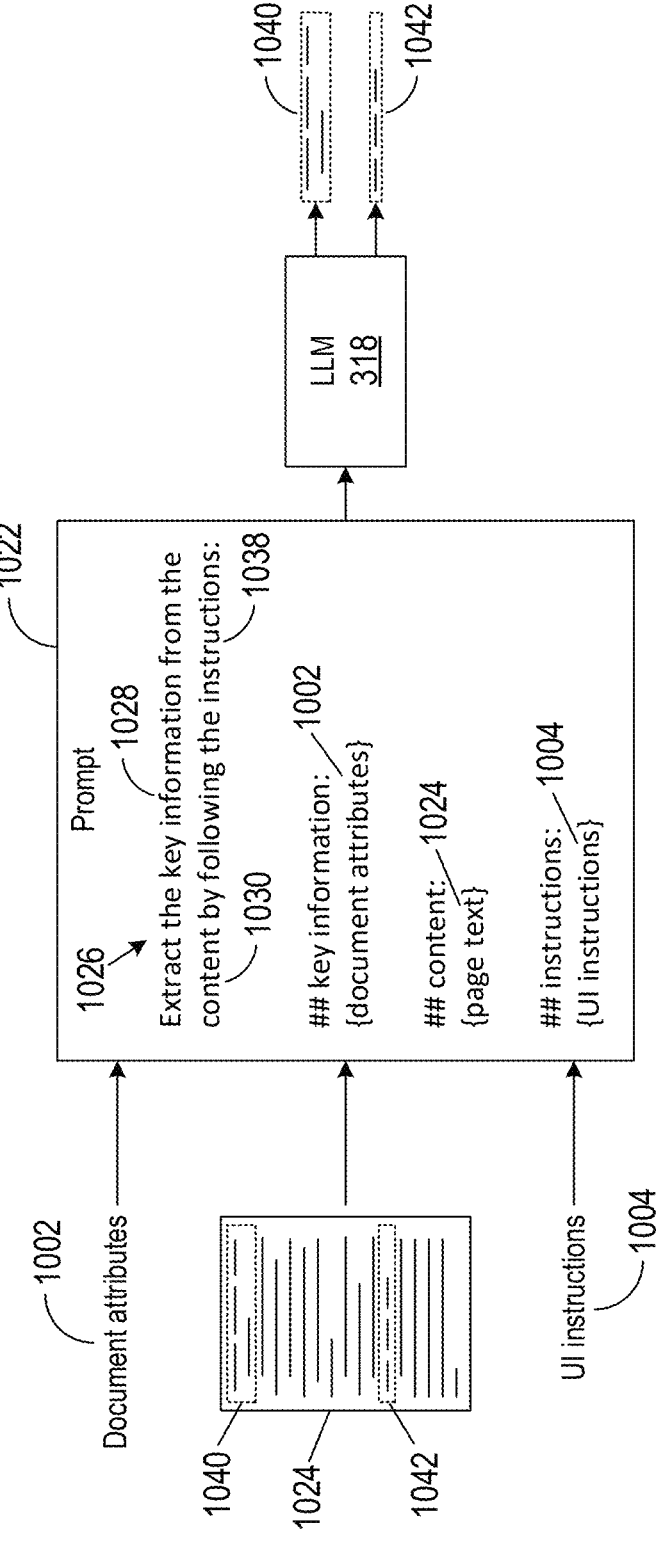
FIG. 10B depicts an example prompt that can be used to input document attributes, UI instructions, and a page of a text document.

FIG. 10B depicts an example prompt 1022 formed from document attributes 1002, UI instructions 1004, and text of a page 1024 of the text document 118 into the LLM 318. The prompt 1022 includes an instruction 1026 to extract information. In this example, the hashtag of the word "key information" 1028 in the instruction 1026 comprises the document attributes 1002; the hashtag of the word "content" 1030 in the instruction 1026 comprises text of the page 1024; and the hashtag of the word "instructions" 1038 comprises the UI instructions 1004. The prompt 1022 is input to the LLM 318. In this example, the LLM 318 has extracted the text enclosed by dotted-line rectangles 1040 and 1042.

Certain text documents may contain different document attributes that are extracted during document-attribute extraction. The different document attributes extracted from a text document during document-attribute extraction are identified as "candidate extracted document attributes." For example, in FIG. 2, the document attributes window 216 includes the "well name" as a document attribute to extract from the unstructured document. However, different well names may appear in the same text document obtained from the unstructured document. For example, document-attribute extraction may extract the well name "NR-22" from page 5 of a text document and extract a different well name "WE-11" from page 7 of the same text document. The different well names "NR-22" and "WE-11" are candidate extracted document attributes.

In another aspect, the document-attribute extraction engine 122 uses the LLM 318 to determine a final extracted document attribute for the text document from the plurality of candidate extracted document attributes. The LLM 318 is used to perform page-attribute extraction based on the document attributes and the UI instruction. If the candidate extracted document attributes extracted at the page level are different, the candidate extracted document attributes are aggregated. A prompt is formed from the aggregated candidate extracted document attributes, the document attributes, and the UI instructions. The prompt is input to the LLM 318 to determine a final extracted document attribute.

Figure 11A:
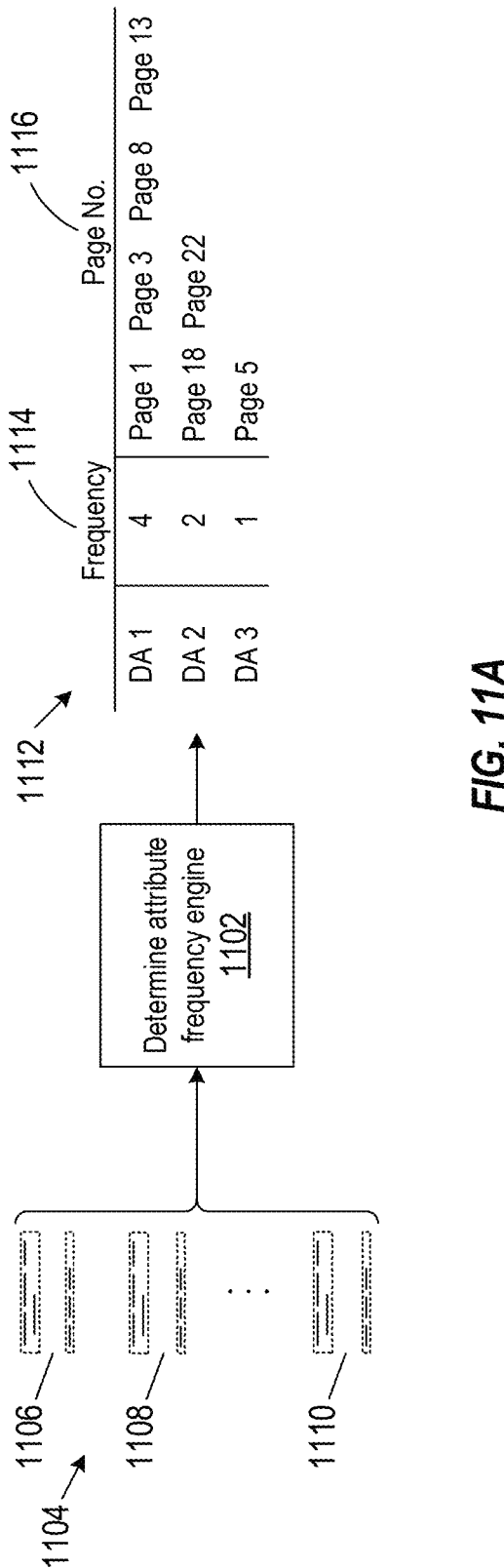
FIGS. 11A-11B depict an example of obtaining a final extracted document attribute from a plurality of candidate extracted document attributes.
Figure 11B:
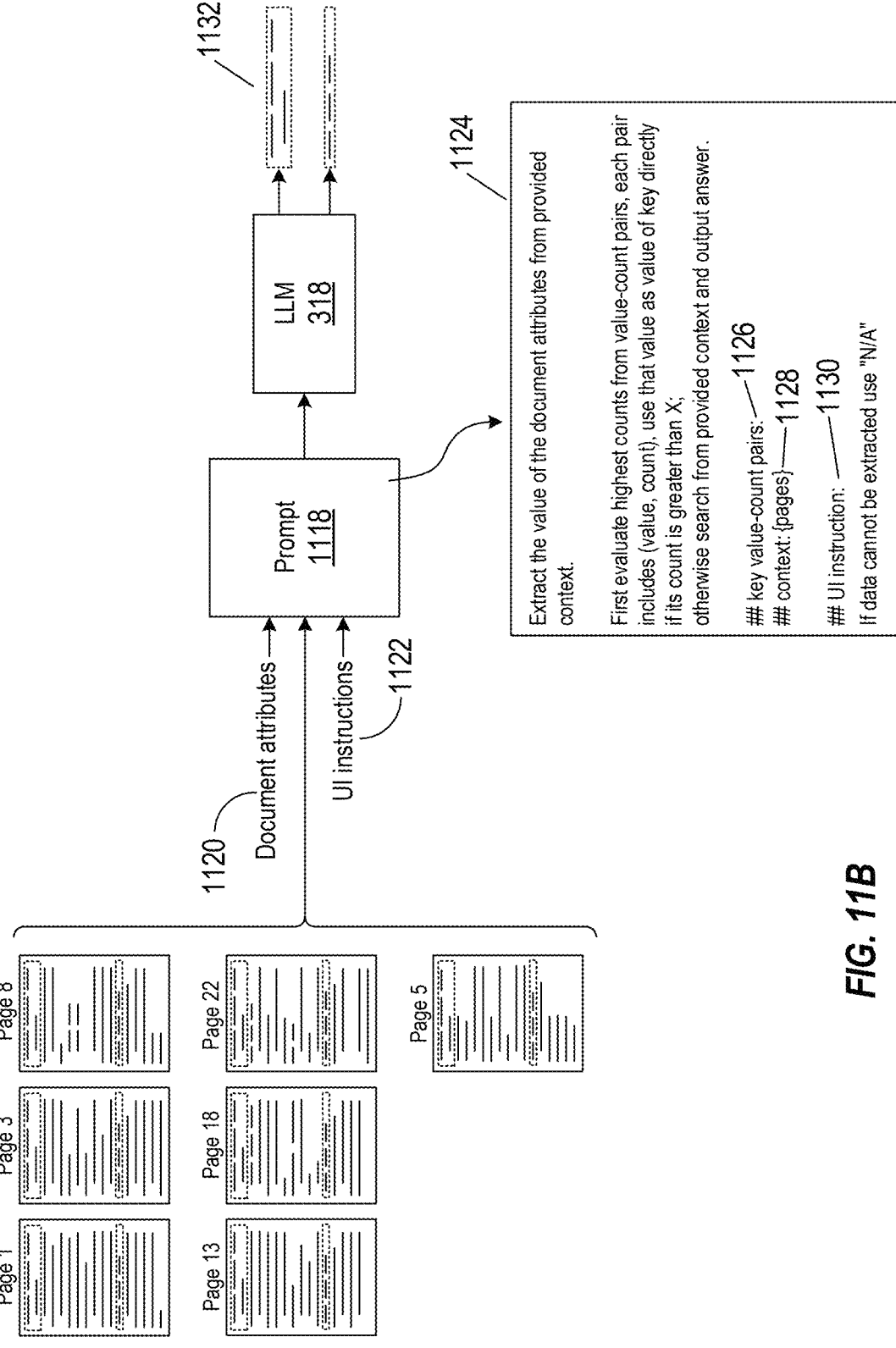

FIGS. 11A-11B depicts an example of obtaining a final extracted document attribute from a plurality of candidate extracted document attributes. In FIG. 11A, a determine attribute frequency engine 1102 receives as input candidate extracted document attributes 1104, such as the extracted document attributes obtained as described above with reference to FIG. 10A. In this example, the candidate extracted document attributes 1104 are composed of three different types of document attributes. For example, extracted document attributes 1106 correspond to a first type of document attributes denoted by DA1, extracted document attributes 1108 correspond to a second type of document attributes denoted by DA2, and extracted document attributes 1110 corresponds to a third type of document attributes denoted by DA3. The frequencies of the three different types of attributes output from the determine attribute frequency engine 1102 are displayed in a table 1112. Column 1114 list the frequencies of the candidate extracted document attributes. Column 1116 list the corresponding page numbers.

In FIG. 11B, a prompt 1118 is formed from the document attributes 1120, the UI instructions 1122, text of the pages of the text document 118 that contain the extracted document attributes. For example, page 1 of the text document 118 contains the candidate extracted document attribute DA1. As shown in FIG. 11B, the prompt 1118 is input to the LLM 318. FIG. 11B includes an example prompt 1124. The example prompt 1124 includes parameters for count-value pairs 1126, context 1128, and extraction instructions 1130 that can be added to the prompt 1124. The LLM 318 generates final extracted document attributes 1132 for the text document 118 from the candidate extracted attributes contained in the document pages and instructions provided in the prompt 118.

User Interface Output

Figure 12:
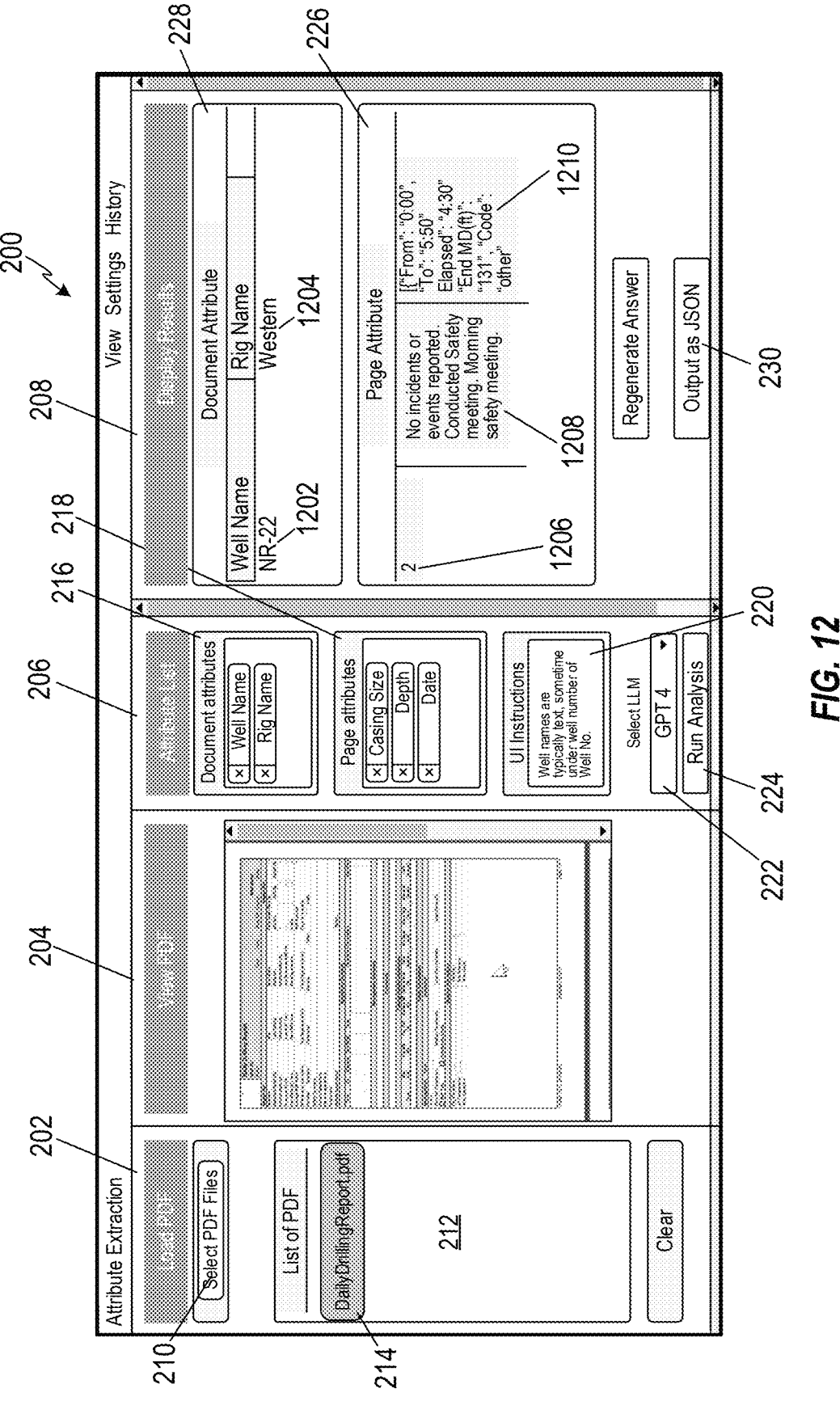
FIG. 12 depicts the example UI with aggregated extracted page attributes and extracted document attributes.

FIG. 12 depicts the example UI 200 with aggregated extracted page attributes and extracted document attributes in a tabular format. In this example, an extracted document attribute 1202 is a well name "NR-22" and an extracted document attribute 1204 is a rig name "Western" displayed in document attribute window 228. Extracted page attributes include a page number "2" 1206 of the text document displayed in the viewing pane 204, a 24 hour summary 1208 of well operations, and an operations summary 1210 are displayed in page attribute window 226. The example UI 200 includes the "Output as JSON" button 230 that when clicked on by the user 102 causes the post processing engine 132 of FIG. 1 to convert the extracted page attributes from tabular format displayed in the page attribute window 226 into the JSON format and convert the extracted document attributes from tabular format displayed in the document attribute window 228 into the JSON format.

Example Methods for Extracting Attributes from Documents

FIG. 13 depicts a flow diagram of a method 1300 for extracting attributes from documents with varying formats, layouts, and complexities.

In block 1302, a UI that enables a user to select a document, page attributes, document attributes, instructions for extracting attributes, and select an LLM is displayed as described above with reference to FIG. 2.

In block 1304, an unstructured document is obtained from a document knowledge base as described above with reference to FIG. 1.

In block 1306, text recognition is performed on the unstructured document to obtain a digitized text document as described above with reference to FIG. 1.

In block 1308, an extract page attributes from the text document using the LLM method is performed as described above with reference to FIGS. 3A-3B. An example implementation of the extract page attributes from the text document using the LLM process is described below with reference to FIG. 14.

In block 1310, an extract document attributes from the text document using the LLM method is performed as described above with reference to FIGS. 4A-11B. An example implementation of the extract document attributes from the text document using the LLM process is described below with reference to FIG. 15.

In block 1312, the extracted page attributes obtained in block 1308 and the extracted document attributes obtained in block 1310 are standardized to obtain standardized extraction results as described above with reference to FIG. 1.

In block 1314, the standardized extracted page attributes and the standardized extracted document attributes are displayed in the UI as described above with reference to FIG. 12.

The method 1300 provides a technical solution to the technical problems associated with traditional text extraction tools by incorporating AI LLM to extract information from any unstructured documents. The method 1300 provides a novel end-to-end process for extracting user selected information from any unstructured document. Unlike existing techniques for extracting information, the method 1300 performs information extraction without any human intervention.

Figure 14:
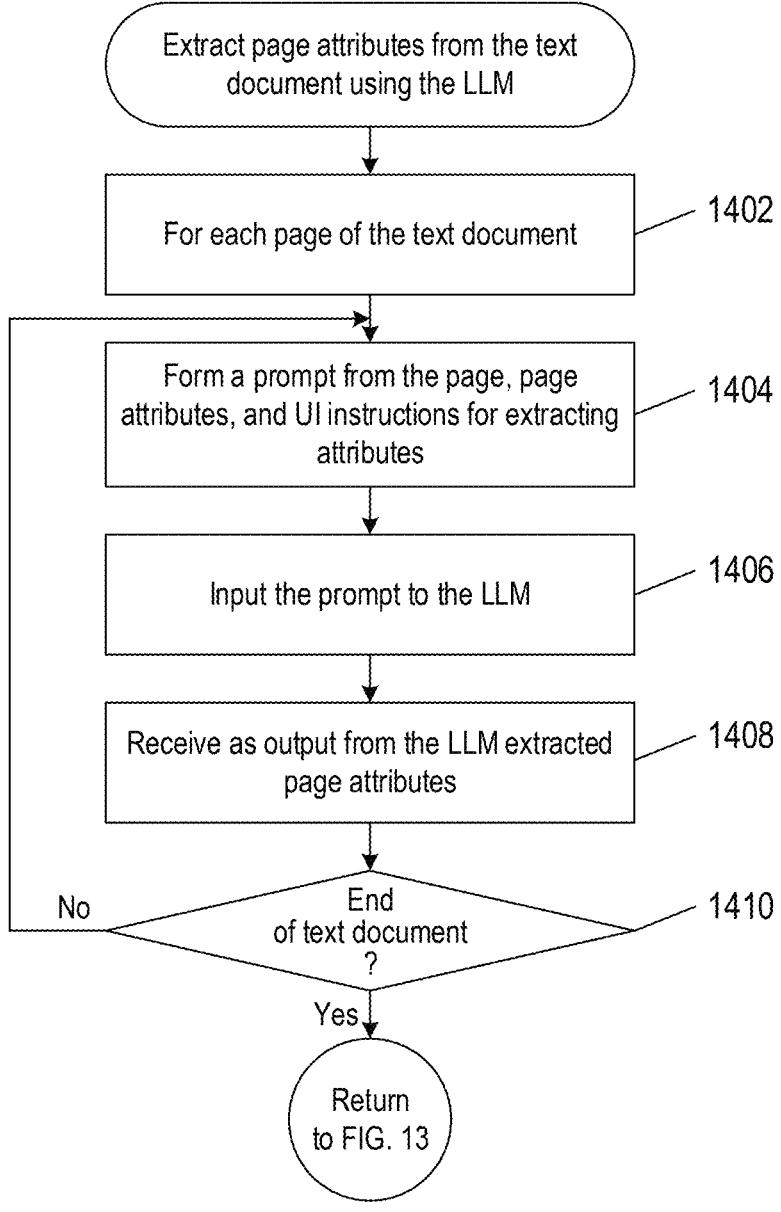
FIG. 14 depicts the extract page attributes from the text document using the LLM method of FIG. 13.

FIG. 14 depicts the extract page attributes from the text document using the LLM method of block 1308 in FIG. 13.

A loop beginning with block 1402 repeats the operations represented by blocks 1404, 1406, and 1408 for each page of the text document.

In block 1404, a prompt is formed from the text of the page, page attributes, and UI interface instructions as described above with reference to FIG. 3B.

In block 1406, the prompt obtained in block 1404 is input the LLM as described above with reference to FIGS. 3A-3B.

In block 1408, extracted page attributes are output from the LLM as described above with reference to FIG. 3A.

In block 1410, control returns to the method of FIG. 13 when the end of the text document is reached. Otherwise, the operations represented by blocks 1404, 1406, and 1408 are repeated if the end of the text document has not been reached.

Figure 15:
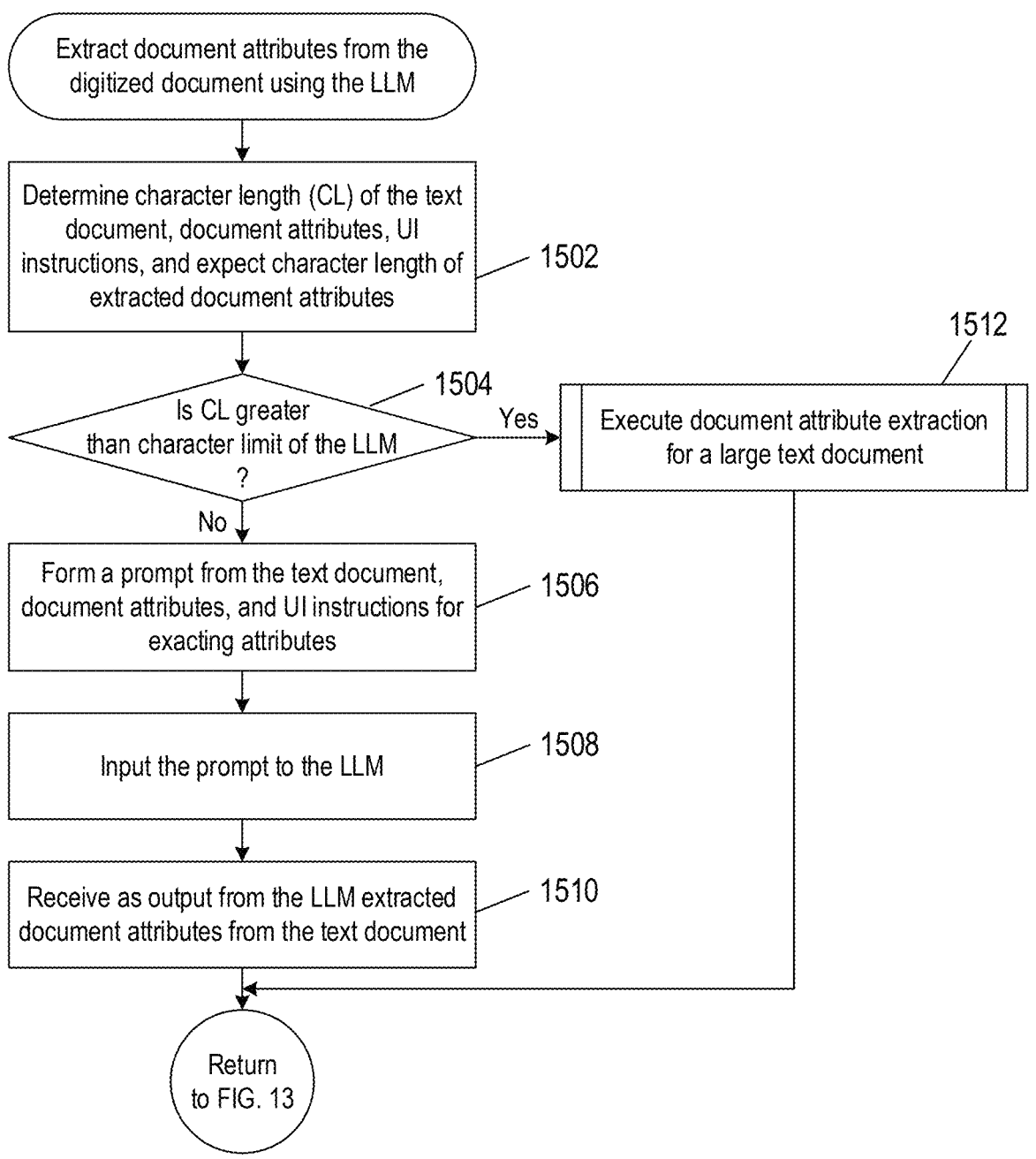
FIG. 15 depicts the extract document attributes from the text document using the LLM method of FIG. 13.

FIG. 15 depicts the extract document attributes from the text document using the LLM method of block 1310 in FIG. 13.

In block 1502, the character length of the text document, document attributes, and UI instructions are determined as described above.

In block 1504, if the character length is greater than the character limit of the LLM, control flows to block 1512. Otherwise, control flows to block 1506.

In block 1506, a prompt is formed from the text document, document attributes, and UI instructions as described above with reference to FIG. 4B.

In block 1508, the prompt obtained in block 1506 is input to the LLM as described above with reference to FIG. 4A.

In block 1510, the LLM outputs extracted document attributes as described above with reference to FIG. 4A.

In block 1512, an execute document-attribute extraction for a large text document method is performed. Two example implementations of the execute document-attribute extraction for a large text document method are described below with reference to FIGS. 16 and 17. The execute document-attribute extraction for a large text document in block 1512 can be performed as described below with reference to FIG. 16 or FIG. 17.

Figure 16:
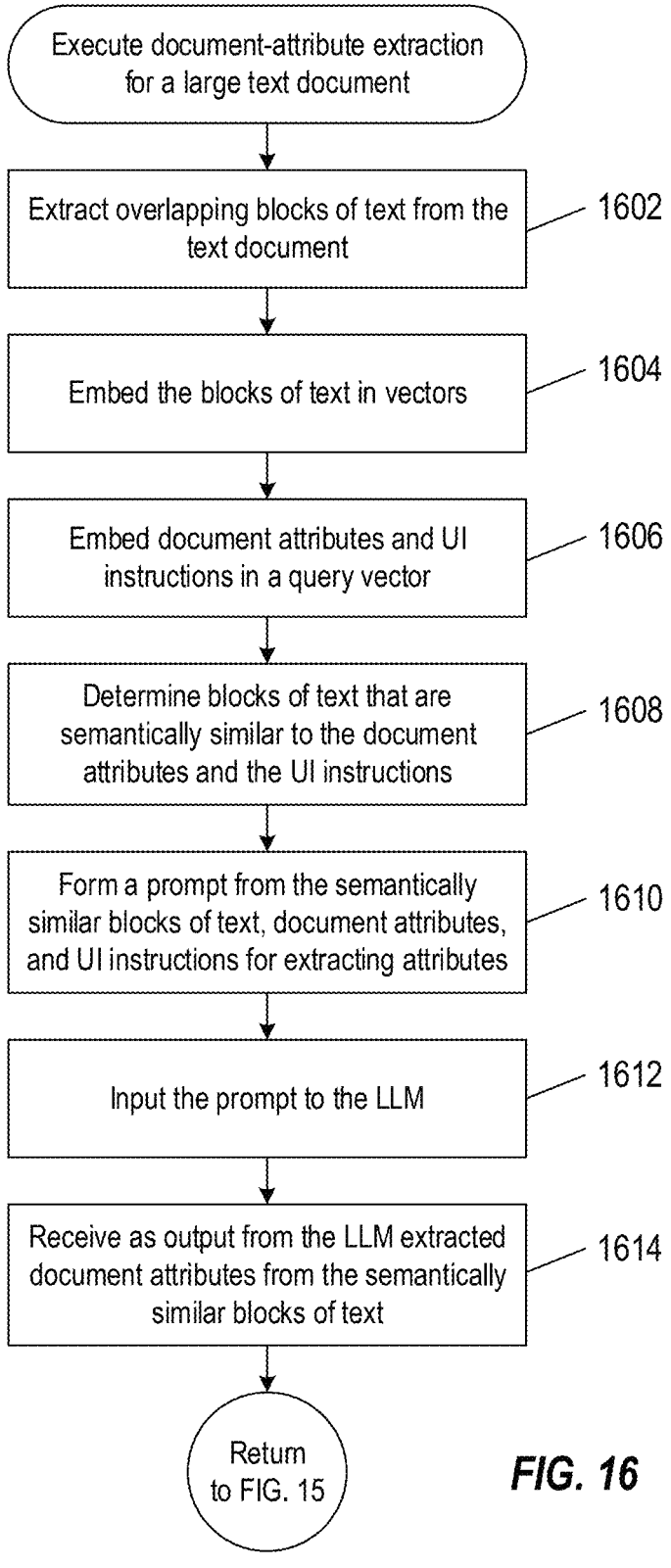
FIG. 16 depicts the execute document-attribute extraction for a large text document method of FIG. 15.

FIG. 16 depicts the execute document-attribute extraction for a large text document method in block 1512 of FIG. 15.

In block 1602, overlapping blocks of text are extracted from the text document as described above with reference to FIG. 5.

In block 1604, the blocks of text are embedded in vectors as described above with reference to FIG. 6.

In block 1606, the document attributes and the UI instructions are embedded in a query vector as described above with reference to FIG. 6.

In block 1608, the blocks of text that are semantically similar to the document attributes and UI instructions are determined as described above with reference to FIG. 7.

In block 1610, a prompt is formed from the semantically similar blocks of text, document attributes, and the UI instructions as described above with reference to FIG. 9.

In block 1612, the prompt obtained in block 1610 is input to the LLM as described above with reference to FIG. 9.

In block 1614, the LLM outputs extracted document attributes as described above with reference to FIG. 9.

Figure 17:
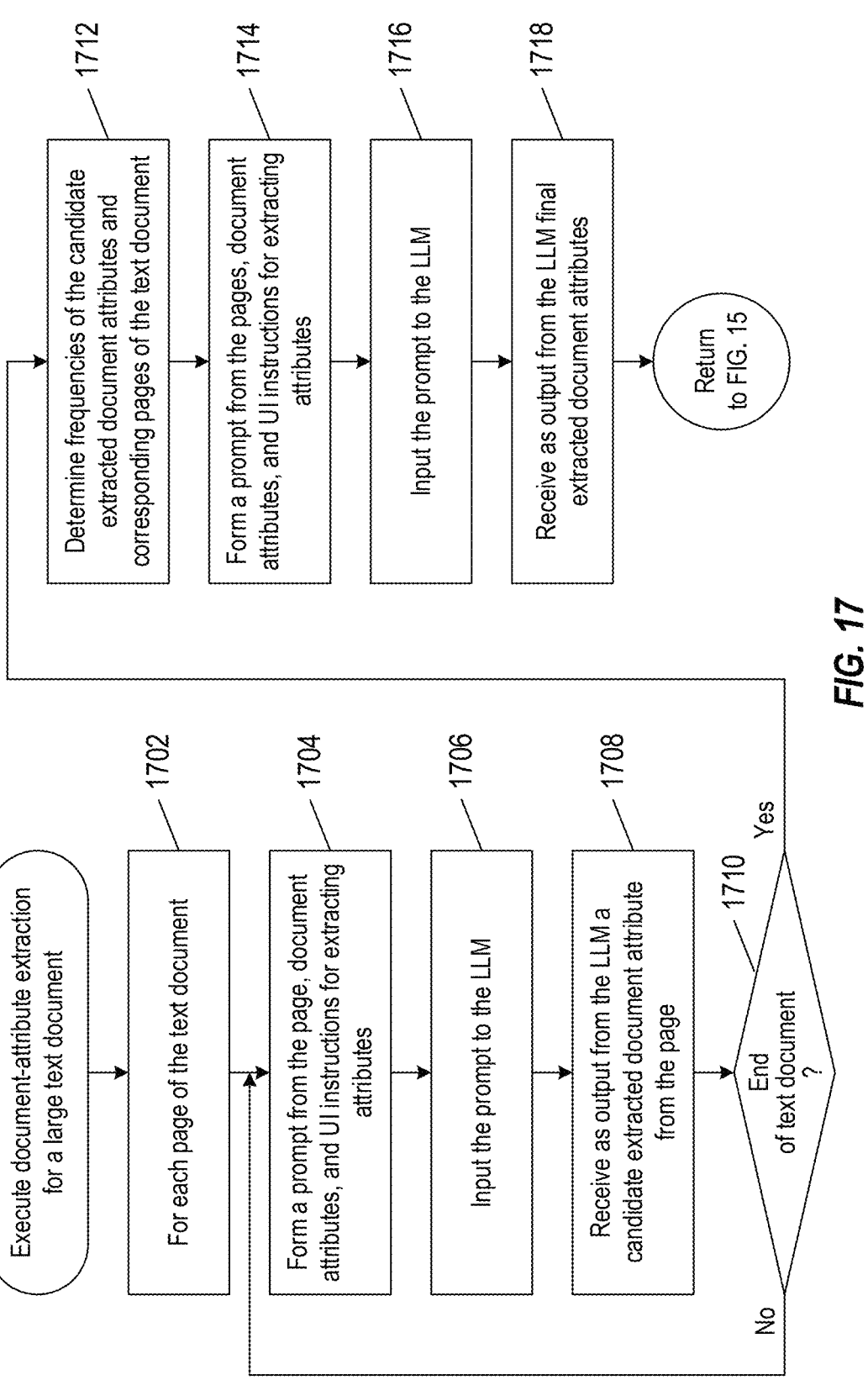
FIG. 17 depicts the execute document-attribute extraction for a large text document method of FIG. 15.

FIG. 17 depicts the execute document-attribute extraction for a large text document method in block 1512 of FIG. 15.

A loop beginning with block 1702 repeats the operations represented by blocks 1704, 1706, and 1708 for each page of the text document.

In block 1704, a prompt is formed from the page, document attributes, and UI instructions as described above with reference to FIG. 10B.

In block 1706, the prompt formed in block 1704 is input to the LLM as described above with reference to FIG. 10A.

In block 1708, the LLM outputs extracted document attributes as described above with reference to FIG. 10A.

In block 1710, if the end of the text document is reached, control flows to block 1712. Otherwise, the operations represented by blocks 1704, 1706, and 1708 are repeated for another page of the text document.

In block 1712, frequency of different extracted document attributes and corresponding pages of the text document are determined as described above with reference to FIG. 11A.

In block 1714, a prompt is formed from the pages of the different extracted document attributes, document attributes, and UI instructions as described above with reference to FIG. 11B.

In block 1716, the prompt formed in block 1714 is input to the LLM as described above with reference to FIG. 11B.

Figure 18:
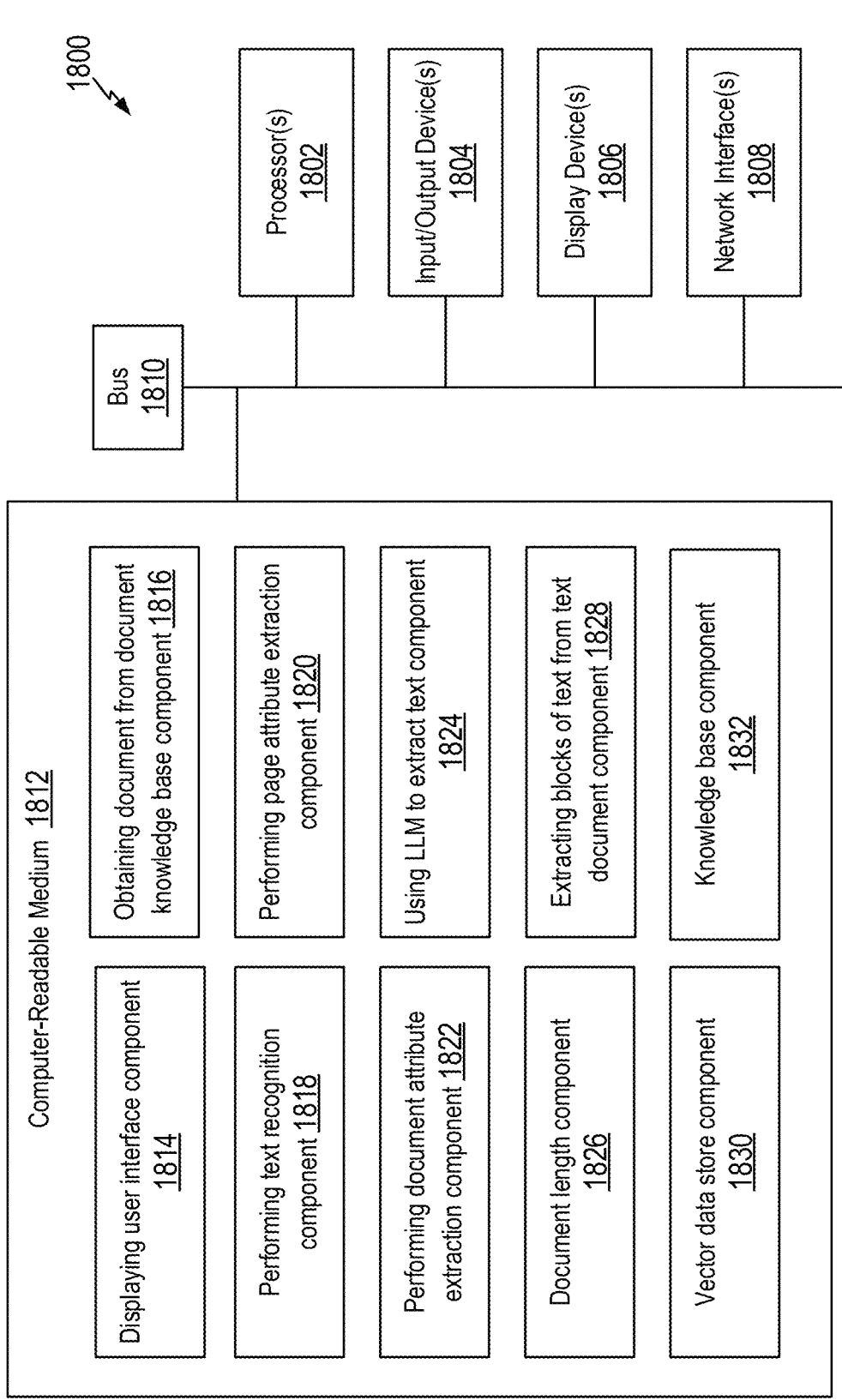
FIG. 18 depicts an example processing system with which aspects of the present disclosure can be performed.

In block 1718, the LLM outputs extracted document attributes as described above with reference to FIG. 11B. Example Processing System for Extracting Attributes from Documents with Varying Formats, Layouts, and Complexities FIG. 18 depicts an example processing system 1800 configured to perform various aspects described herein, including, for example, method 1300 as described above with respect to FIG. 13.

Processing system 1800 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1800 includes one or more processors 1802, one or more input/output devices 1804, one or more display devices 1806, one or more network interfaces 1808 through which processing system 1800 is connected to one or more networks (e.g., a local network, an intranet, the Internet, or any other group of processing systems communicatively connected to each other), and computer-readable medium 1812. In the depicted example, the aforementioned components are coupled by a bus 1810, which may generally be configured for data exchange amongst the components. Bus 1810 may be representative of multiple buses, while only one is depicted for simplicity.

Processor(s) 1802 are generally configured to retrieve and execute instructions stored in one or more memories, including local memories like computer-readable medium 1812, as well as remote memories and data stores. Similarly, processor(s) 1802 are configured to store application data residing in local memories like the computer-readable medium 1812, as well as remote memories and data stores. More generally, bus 1810 is configured to transmit programming instructions and application data among the processor(s) 1802, display device(s) 1806, network interface(s) 1808, and/or computer-readable medium 1812. In certain embodiments, processor(s) 1802 are representative of a one or more central processing units (CPUs), graphics processing unit (GPUs), tensor processing unit (TPUs), accelerators, and other processing devices.

Input/output device(s) 1804 may include any device, mechanism, system, interactive display, and/or various other hardware and software components for communicating information between processing system 1800 and a user of processing system 1800. For example, input/output device(s) 1804 may include input hardware, such as a keyboard, touch screen, button, microphone, speaker, and/or other device for receiving inputs from the user and sending outputs to the user.

Display device(s) 1806 may generally include any sort of device configured to display data, information, graphics, user interface elements, and the like to a user. For example, display device(s) 1806 may include internal and external displays such as an internal display of a tablet computer or an external display for a server computer or a projector. Display device(s) 1806 may further include displays for devices, such as augmented, virtual, and/or extended reality devices. In various embodiments, display device(s) 916 may be configured to display a graphical user interface.

Network interface(s) 1808 provide processing system 1800 with access to external networks and thereby to external processing systems. Network interface(s) 1808 can generally be any hardware and/or software capable of transmitting and/or receiving data via a wired or wireless network connection. Accordingly, network interface(s) 1808 can include a communication transceiver for sending and/or receiving any wired and/or wireless communication.

Computer-readable medium 1812 may be a volatile memory, such as a random access memory (RAM), or a nonvolatile memory, such as nonvolatile random access memory (NVRAM), or the like. In this example, computer-readable medium 1812 includes a displaying user interface component 1814, an obtaining document from document knowledge base component 1816, a performing text recognition component 1818, a performing page attribution extraction component 1820, a performing document attribute extraction component 1822, a using LLM to extract text component 1824, determining document length component 1826, extracting blocks of text from a text document component 1828, a vector data store component 1830, and knowledge base component 1832.

In certain embodiments, user interface component 1814 is configured to display a UI as described above with reference to FIGS. 1, 2, and 12.

In certain embodiments, document knowledge base component 1816 is configured to obtain an unstructured document from the knowledge base as described above with reference to FIG. 1 and block 1304 of FIG. 13.

In certain embodiments, text recognition component 1818 is configured to perform text recognition of the unstructured document to obtain a text document as described above with reference to FIG. 1 and block 1306 of FIG. 13.

In certain embodiments, page attribute extraction component 1820 is configured to extract page attributes from the text document as described above with reference to block 1308 of FIG. 13.

In certain embodiments, document attribute extraction component 1822 is configured to extract document attributes from the text document as described above with reference to block 1310 of FIG. 13.

In certain embodiments, extract text component 1824 is configured to use the LLM to extract text from prompts as described above with reference to FIGS. 3B, 4B, 10B, and 11B.

In certain embodiments, document length component 1826 is configured to determine character length of the text document as described above with reference to block 1502 of FIG. 15.

In certain embodiments, text document component 1828 is configured to extract blocks of text from the text document as described above with reference to FIG. 6 and block 1602 of FIG. 16.

In certain embodiments, vector data store component 1830 is configured to store vectors as described above with reference to FIG. 6.

In certain embodiments, knowledge base component 1832 is configured to store documents as described above with reference to FIG. 1.

Note that FIG. 18 is just one example of a processing system consistent with aspects described herein, and other processing systems having additional, alternative, or fewer components are possible consistent with this disclosure.

Example Clauses

Implementation examples are described in the following numbered clauses:

Clause 1: A computer-implemented method, comprising: displaying a user interface (UI) that enables a user to select an unstructured document based on user input of: a page attribute, a document attribute, and UI instructions; retrieving the unstructured document from the knowledge base based on the user having selected the unstructured document via the UI; converting the unstructured document into a text document using a text recognition engine; obtaining, as output from a large language model (LLM), an extracted page attribute from the text document based on the text document, the page attribute, and the UI instructions input to the LLM; obtaining, as output from the LLM, an extracted document attribute from the text document based on the text document, the document attribute, and the UI instructions input to the LLM; and displaying the extracted page attribute and the extracted document attribute in the UI, wherein the extracted page attribute contains a first type of information recorded in text on a single page of the text document and the extracted document attribute contains a second type of information recorded in text on more than one page of the text document.

Clause 2: The method of Clause 1, wherein displaying the UI comprises enabling the user to select the LLM from a plurality of different types of LLMs.

Clause 3: The method of any of Clause 1-2, further comprising: standardizing the extracted page attribute and the extracted document attribute into a text-based format.

Clause 4: The method of any of Clauses 1-3, wherein obtaining, as output from the LLM, the extracted page attribute from the text document comprises: for each page of the text document, forming a prompt from text of a respective page of the text document, the page attribute, and the UI instructions, inputting the prompt to the LLM, and receiving the extracted page attribute as output from the LLM.

Clause 5: The method of any of Clauses 1-4, wherein obtaining, as output from the LLM, the extracted document attribute from the text document comprises: determining a character length of the text document, the document attribute, the UI instructions, and an expected number of characters of the extracted document attribute; forming a prompt from the text document, the document attribute, and the UI instructions in response to the character length being less than a character limit of the LLM; inputting the prompt to the LLM; and receiving the extracted document attribute as output from the LLM.

Clause 6: The method of any of Clauses 1-5, wherein obtaining, as output from the LLM, the extracted document attribute from the text document comprises: determining a character length of the text document, the document attribute, the UI instructions, and an expected number of characters of the extracted document attribute; extracting overlapping blocks of text from the text document in response to the character length being larger than a character limit of the LLM; embedding the blocks of text in vectors; embedding the document attribute and the UI instructions in a query vector; determining the blocks of text that are semantically similar to the document attribute and the UI instructions based on the vectors and the query vector; forming a prompt from the blocks of text that are semantically similar to the document attribute and the UI instructions, the document attribute, and the UI instructions; inputting the prompt to the LLM; and receiving the extracted document attribute as output from the LLM.

Clause 7: The method of any of Clauses 1-6, wherein obtaining, as output from the LLM, the extracted document attribute from the text document comprises: for each page of the text document, forming a prompt from text of a respective page of the text document, the document attribute, and the UI instructions, inputting the prompt to the LLM, and receiving a candidate extracted document attribute as output from the LLM; determining frequencies of candidate extracted document attributes and corresponding pages of the text document; forming a prompt from the corresponding pages, the document attribute, and the UI instructions; inputting the prompt to the LLM; and receiving the extracted document attribute as output from the LLM.

Clause 8: One or more processing systems, comprising: one or more memories comprising computer-executable instructions; and one or more processors configured to execute the computer-executable instructions and cause the one or more processing systems to perform a method in accordance with any one of Clauses 1-7.

Clause 9: One or more processing systems, comprising means for performing a method in accordance with any one of Clauses 1-7.

Clause 10: One or more non-transitory computer-readable media comprising instructions that, when executed by one or more processors of a computing system, cause the computing system to perform the operations of any one of Clauses 1-7.

Clause 10: One or more computer program products embodied on one or more computer-readable storage media comprising code for performing a method in accordance with any one of Clauses 1-7.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
displaying a user interface (UI) that enables a user to select an unstructured document based on user input of:
a page attribute,
a document attribute, and
UI instructions;
retrieving the unstructured document from a knowledge base based on the user having selected the unstructured document via the UI;
converting the unstructured document into a text document using a text recognition engine;
obtaining, as output from a large language model (LLM), an extracted page attribute from the text document and an extracted document attribute from the text document based on the text document, the page attribute, the document attribute, and the UI instructions input to the LLM; and
displaying the extracted page attribute and the extracted document attribute in the UI, wherein the extracted page attribute contains a first type of information recorded in text on a single page of the text document and the extracted document attribute contains a second type of information recorded in text on more than one page of the text document.

2. The method of claim 1, wherein displaying the UI comprises enabling the user to select the LLM from a plurality of different types of LLMs.

3. The method of claim 1, further comprising standardizing the extracted page attribute and the extracted document attribute into a text-based format.

4. The method of claim 1, wherein obtaining, as output from the LLM, the extracted page attribute from the text document comprises:
for each page of the text document,
forming a prompt from text of a respective page of the text document, the page attribute, and the UI instructions,
inputting the prompt to the LLM, and
receiving the extracted page attribute as output from the LLM.

5. The method of claim 1, wherein obtaining, as output from the LLM, the extracted document attribute from the text document comprises:
determining a character length of the text document, the document attribute, the UI instructions, and an expected number of characters of the extracted document attribute;
forming a prompt from the text document, the document attribute, and the UI instructions in response to the character length being less than a character limit of the LLM;
inputting the prompt to the LLM; and
receiving the extracted document attribute as output from the LLM.

6. The method of claim 1, wherein obtaining, as output from the LLM, the extracted document attribute from the text document comprises:
determining a character length of the text document, the document attribute, the UI instructions, and an expected number of characters of the extracted document attribute;
extracting overlapping blocks of text from the text document in response to the character length being larger than a character limit of the LLM;
embedding the blocks of text in vectors;
embedding the document attribute and the UI instructions in a query vector;

determining the blocks of text that are semantically similar to the document attribute and the UI instructions based on the vectors and the query vector;

forming a prompt from the blocks of text that are semantically similar to the document attribute and the UI instructions, the document attribute, and the UI instructions;

inputting the prompt to the LLM; and receiving the extracted document attribute as output from the LLM.

7. The method of claim 1, wherein obtaining, as output from the LLM, the extracted document attribute from the text document comprises:

for each page of the text document,
    forming a prompt from text of a respective page of the text document, the document attribute, and the UI instructions,
    inputting the prompt to the LLM, and
    receiving a candidate extracted document attribute as output from the LLM;

determining frequencies of candidate extracted document attributes and corresponding pages of the text document;

forming a prompt from the corresponding pages, the document attribute, and the UI instructions;

inputting the prompt to the LLM; and receiving the extracted document attribute as output from the LLM.

8. A processing system, comprising:

one or more memories comprising computer-executable instructions; and one or more processors configured to execute the computer-executable instructions and cause the processing system to:

display a user interface (UI) on a display device that enables a user to select an unstructured document based on user input of:

a page attribute, a document attribute, and

UI instructions;

retrieve the unstructured document from a knowledge base based on the user having selected the unstructured document via the UI;

convert the unstructured document into a text document using a text recognition engine;

obtain, as output from a large language model (LLM), an extracted page attribute from the text document and an extracted document attribute from the text document based on the text document, the page attribute, the document attribute, and the UI instructions input to the LLM; and display the extracted page attribute and the extracted document attribute in the UI, wherein the extracted page attribute contains a first type of information recorded in text on a single page of the text document and the extracted document attribute contains a second type of information recorded in text on more than one page of the text document.

9. The processing system of claim 8, wherein to display the UI the one or more processors are configured to cause the processing system to enable the user to select the LLM from a plurality of different types of LLMs.

10. The processing system of claim 8, wherein the one or more processors are configured to cause the processing system to standardize the extracted page attribute and the extracted document attribute into a text-based format.

11. The processing system of claim 8, wherein to obtain, as output from the LLM, the extracted page attribute from the text document the one or more processors are configured to cause the processing system to:

for each page of the text document,
    form a prompt from text of a respective page of the text document, the page attribute, and the UI instructions,
    input the prompt to the LLM, and
    receive the extracted page attribute as output from the LLM.

12. The processing system of claim 8, wherein to obtain, as output from the LLM, the extracted document attribute from the text document the one or more processors are configured to cause the processing system to:

determine a character length of the text document, the document attribute, the UI instructions, and an expected number of characters of the extracted document attribute;

form a prompt from the text document, the document attribute, and the UI instructions in response to the character length being less than a character limit of the LLM;

input the prompt to the LLM; and receive the extracted document attribute as output from the LLM.

13. The processing system of claim 8, wherein to obtain, as output from the LLM, the extracted document attribute from the text document the one or more processors are configured to cause the processing system to:

determine a character length of the text document, the document attribute, the UI instructions, and an expected number of characters of the extracted document attribute;

extract overlapping blocks of text from the text document in response to the character length being larger than a character limit of the LLM;

embed the blocks of text in vectors;

embed the document attribute and the UI instructions in a query vector;

determine the blocks of text that are semantically similar to the document attribute and the UI instructions based on the vectors and the query vector;

form a prompt from the blocks of text that are semantically similar to the document attribute and the UI instructions, the document attribute, and the UI instructions;

input the prompt to the LLM; and receive the extracted document attribute as output from the LLM.

14. The processing system of claim 8, wherein to obtain, as output from the LLM, the extracted document attribute from the text document the one or more processors are configured to cause the processing system to:

for each page of the text document,
    form a prompt from text of a respective page of the text document, the document attribute, and the UI instructions,
    input the prompt to the LLM, and
    receive a candidate extracted document attribute as output from the LLM;

determine frequencies of candidate extracted document attributes and corresponding pages of the text document;

form a prompt from the corresponding pages, the document attribute, and the UI instructions;

input the prompt to the LLM; and receive the extracted document attribute as output from the LLM.

15. An apparatus comprising:
a text recognition engine configured to convert an unstructured document into a text document;
a page-attribute extraction engine configured to use a large language model (LLM) to extract page attributes from the text document, each extracted page attribute containing a first type of information recorded in text on a single page of the text document;
a document-attribute extraction engine configured to use the LLM to extract document attributes from the text document, each extracted document attribute contains a second type of information recorded in text on more than one page of the text document;
an aggregation engine configured to combine the extracted page attributes and the extracted document attributes into aggregated extracted page attributes and extracted document attributes; and
a user interface (UI) displayed on a display device, the UI configured to display the aggregated extracted page attributes and the extracted document attributes.

16. The apparatus of claim 15, wherein the text recognition engine comprises an optical character recognition engine configured to convert an image of text of the unstructured document into a text document format of the text document.

17. The apparatus of claim 15, wherein the page-attribute extraction engine is configured to:
for each page of the text document,
form a prompt from text of a respective page of the text document, a page attribute, and UI instructions for extracting attributes,
input the prompt to the LLM, and
receive an extracted page attribute as output from the LLM.

18. The apparatus of claim 15, wherein the document-attribute extraction engine is configured to:
determine a character length of the text document, a document attribute, UI instructions for extracting attributes, and an expected number of characters of an extracted document attribute;
form a prompt from the text document, the document attribute, and the UI instructions in response to the character length being less than a character limit of the LLM;

input the prompt to the LLM; and
receive the extracted document attribute as output from the LLM.

19. The apparatus of claim 15, wherein the document-attribute extraction engine is configured to:
determine a character length of the text document, a document attribute, UI instructions for extracting attributes, and an expected number of characters of an extracted document attribute;
extract overlapping blocks of text from the text document in response to the character length being larger than a character limit of the LLM;
embed the blocks of text into vectors;
embed the document attribute and the UI instructions for extracting attributes into a query vector;
determine the blocks of text that are semantically similar to the document attribute and the UI instructions based on the vectors and the query vector;
form a prompt from the blocks of text that are semantically similar to the document attribute and the UI instructions, the document attribute, and the UI instructions;
input the prompt to the LLM; and
receive the extracted document attribute as output from the LLM.

20. The apparatus of claim 15, wherein the document-attribute extraction engine is configured to:
for each page of the text document,
form a prompt from text of a respective page of the text document, a document attribute, and UI instructions for extracting attributes,
input the prompt to the LLM, and
receive a candidate extracted document attribute as output from the LLM;
determine frequencies of candidate extracted document attributes and corresponding pages of the text document;
form a prompt from the corresponding pages, the document attribute, and the UI instructions;
input the prompt to the LLM; and
receive an extracted document attribute as output from the LLM.

* * * * *